(12) United States Patent
Furtwangler et al.

(10) Patent No.: US 11,836,828 B2
(45) Date of Patent: Dec. 5, 2023

(54) CONTROLLING INTERACTIONS WITH VIRTUAL OBJECTS

(71) Applicant: META PLATFORMS TECHNOLOGIES, LLC, Menlo Park, CA (US)

(72) Inventors: Brandon Furtwangler, Issaquah, WA (US); Norah Riley Smith, Oakland, CA (US); Andrew C Johnson, Somerville, MA (US); Etienne Pinchon, Culver City, CA (US); Samuel Matthew Levatich, Seattle, WA (US); Matthew Alan Insley, Menlo Park, CA (US); Jason Charles Leimgruber, Edmonds, WA (US); Jennifer Lynn Spurlock, Seattle, WA (US); Michael Medlock, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/514,800

(22) Filed: Oct. 29, 2021

(65) Prior Publication Data

US 2023/0140550 A1     May 4, 2023

(51) Int. Cl.
*G06T 11/00*     (2006.01)
*G06T 7/70*     (2017.01)
*G06F 3/01*     (2006.01)

(52) U.S. Cl.
CPC .............. *G06T 11/00* (2013.01); *G06F 3/011* (2013.01); *G06F 3/016* (2013.01); *G06T 7/70* (2017.01); *G06T 2200/24* (2013.01)

(58) Field of Classification Search
CPC ....... G06T 11/00; G06T 7/70; G06T 2200/24; G06F 3/011; G06F 3/016
See application file for complete search history.

(56) References Cited

U.S. PATENT DOCUMENTS

2012/0218395 A1    8/2012   Andersen et al.
2014/0201674 A1    7/2014   Holz
(Continued)

FOREIGN PATENT DOCUMENTS

CN      108536273 A     9/2018

OTHER PUBLICATIONS

International Search Report and Written Opinion for International Application No. PCT/US2022/048319, dated Feb. 23, 2023, 10 pages.

*Primary Examiner* — Afroza Chowdhury
(74) *Attorney, Agent, or Firm* — Greenberg Traurig, LLP

(57) ABSTRACT

The disclosed computer-implemented method may include generating a virtual item within a virtual environment. The method may also include detecting, using various hardware sensors, a current position of a physical object that is to be portrayed within the virtual environment. The method may next include generating a virtual representation of the physical object within the virtual environment. The virtual representation of the physical object may be configured to at least partially follow movements of the physical object relative to the virtual item. The method may also include presenting the virtual item and the generated virtual representation of the physical object within the virtual environment, where the virtual representation of the physical object is at least partially, controllably decoupled from the movements of the physical object relative to the virtual item. Various other methods, systems, and computer-readable media are also disclosed.

20 Claims, 36 Drawing Sheets

(56) References Cited

U.S. PATENT DOCUMENTS

| | | |
|---|---|---|
| 2016/0018985 A1 | 1/2016 | Bennet et al. |
| 2018/0157398 A1 | 6/2018 | Kaehler et al. |
| 2018/0284982 A1* | 10/2018 | Veeramani ............ G06F 3/0426 |
| 2018/0342103 A1 | 11/2018 | Schwarz et al. |
| 2021/0191600 A1* | 6/2021 | Lemay ................ G06F 3/04842 |
| 2022/0091722 A1* | 3/2022 | Faulkner ............... G06T 19/003 |
| 2022/0101613 A1* | 3/2022 | Rockel .................. G06T 19/006 |
| 2022/0121344 A1* | 4/2022 | Pastrana Vicente .... G06F 3/017 |

* cited by examiner

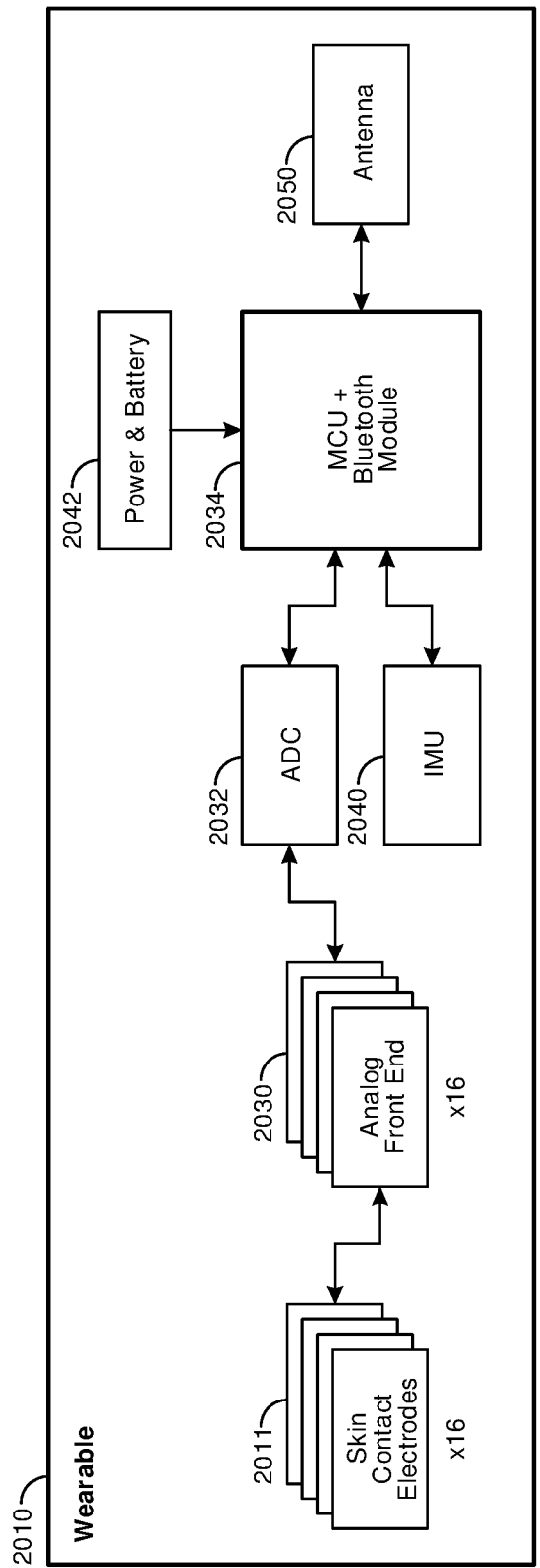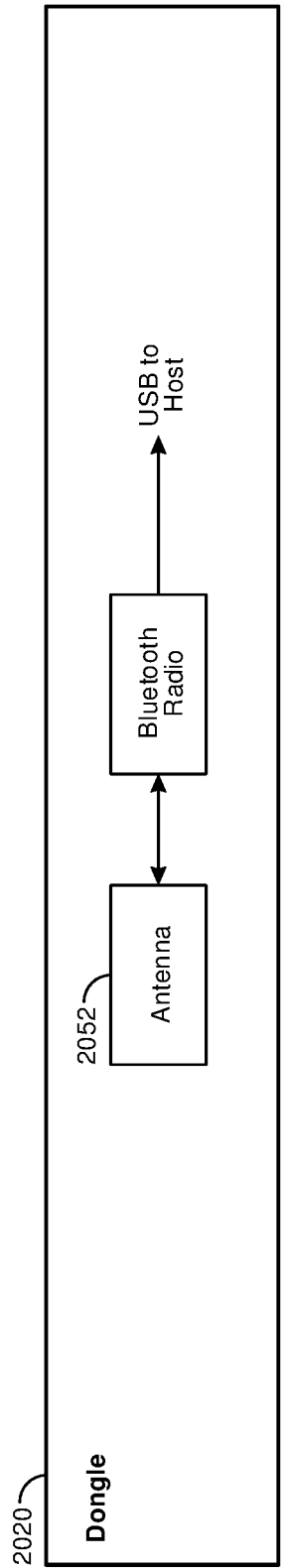
FIG. 20A
FIG. 20B

CONTROLLING INTERACTIONS WITH VIRTUAL OBJECTS

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIGS. 20A and 20B are illustrations of an exemplary schematic diagram with internal components of a wearable system.

Figure 1:
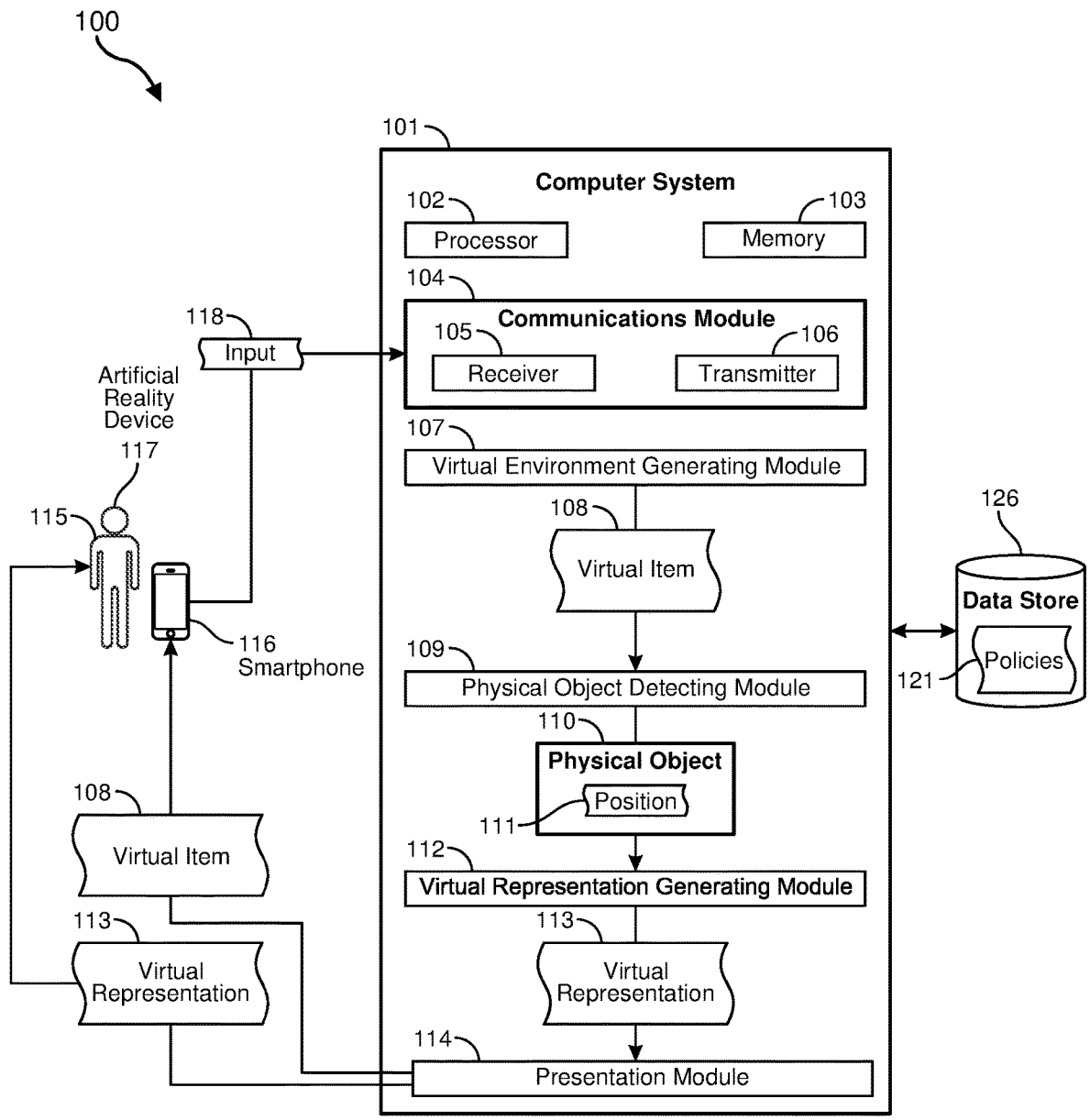
FIG. 1 illustrates a computing environment in which at least some of the embodiments herein may operate.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to various methods of decoupling virtual representations of objects with the physical objects they represent, in a controlled manner. In artificial reality systems, including augmented reality, virtual reality, or other similar systems, steps are often taken to map out and/or track real world objects, and then illustrate those tracked objects in the artificial reality environment. For example, an artificial reality system may determine the current location of a user's arms or hands, and then track any movements of those objects in physical space. The movements of those physical items may then be mapped to virtual arms or hands in an artificial reality environment.

These systems may attempt to precisely map the user's physical movements to the virtual arms or hands in the artificial reality environment. In some cases, these artificial reality systems may use exterior cameras mounted to artificial reality devices or cameras mounted to controllers to determine the current location of the user's hands. This location would then be used to render a virtual representation of the users' physical movements. In other cases, these artificial reality systems may use full physics simulations to physically model the user's fingers, hand, or other body parts, and use that full physics simulation to determine how the user will interact with virtual objects in the artificial reality environment. This full physics simulation, however, is computationally very expensive. Furthermore, whether using external cameras or performing full physics modeling, neither of these approaches provides control over determining when a user has "touched" or otherwise interacted with a virtual object in the virtual environment.

In contrast to such systems, the embodiments herein provide various methods and systems that allow precise control of a user's interactions with virtual objects within an artificial environment. Moreover, at least some of these embodiments may allow virtual interactions with virtual objects feel as though they were physical interactions with physical objects. The embodiments herein may be designed to decouple the location of physical objects (e.g., a user's hands) from the virtual representation of those physical objects. Thus, in contrast to systems that attempt to faithfully reproduce each movement of the user, the embodiments herein controllably decouple the user's movements from the virtual representation of those movements. As such, the process of virtually representing physical objects may be computationally much cheaper than full physics simulations, may provide more flexibility than physics-based solutions, and may allow each interaction with a virtual item to be unique, providing a lifelike feel to each virtual item. These embodiments will be described in greater detail below with reference to the computing environment 100 of FIG. 1 below.

FIG. 1 illustrates a computing environment 100 that includes a computer system 101. The computer system 101 may be substantially any type of computer system including a local computer system or a distributed (e.g., cloud) computer system. The computer system 101 may include at least one processor 102 and at least some system memory 103. The computer system 101 may also include program modules for performing a variety of different functions. The program modules may be hardware-based, software-based, or may include a combination of hardware and software. Each program module may use computing hardware and/or software to perform specified functions, including those described herein below.

For example, the communications module 104 may communicate with other computer systems. The communications module 104 may include wired or wireless communication means that receive and/or transmit data to or from other computer systems. These communication means may include hardware radios including, for example, a hardware-based receiver 105, a hardware-based transmitter 106, or a combined hardware-based transceiver capable of both receiving and transmitting data. The radios may be WIFI radios, cellular radios, Bluetooth radios, global positioning system (GPS) radios, or other types of radios. The communications module 104 may interact with databases, mobile computing devices (such as mobile phones or tablets), embedded or other types of computing systems.

The computer system 101 may also include a virtual environment generating module 107. The virtual environment generating module 107 may be configured to generate artificial reality environments including augmented reality environments, virtual reality environments, and other similar types of virtual or computer-generated environments. These virtual environments may include solely virtual items, or combinations of physical (i.e., real-world) items and virtual items 108. The virtual items 108 may include substantially any item that can be represented by a computer-generated image. In some cases, as will be shown further below with regard to FIG. 3, the virtual item 108 may be an interface with which a user may interact. In other cases, the virtual item may be a wall, a piece of furniture, a toy, a video game, a paintbrush, or any number of other items. The virtual items 108 may have real-world analogs, or may be entirely created out of someone's imagination. The virtual items 108 may thus have substantially any shape, size, color, or design, and may be rendered in two dimensions or three dimensions.

The physical object detecting module 109 of computer system 101 may be configured to detect physical objects 110 and may further determine their position and/or movements. The physical object detecting module 109 may implement any number of sensors or other electronic devices when performing such detections (please see FIGS. 14-20B for examples of such sensors and devices). In some cases, the physical object detecting module 109 may detect the position 111 of a user's hands, fingers, arms, legs, head, or other body parts. In other cases, the physical object detecting module 109 may detect the position of a controller or stylus or other electronic device that is being held in a user's hands. In other cases, the physical object detecting module 109 may detect the position of physical objects within the system's surroundings, including furniture, walls, windows, people, smartphones or other electronic devices, or other items. The physical object detecting module 109 may be configured to tag each item and track its movements (if any) within the environment. In some cases, these movements may be translated to the virtual environment generated by module 107.

The virtual representation generating module 112 of computer system 101 may generate a virtual representation of a detected physical object 110. Thus, for example, if the detected physical object 110 is a user's hand, the virtual representation generating module 112 may generate a virtual representation 113 of the user's hand. This virtual representation 113 may be configured to generally track the real-world physical movements of the user's hand or other physical object 110. In many of the examples herein, the physical object 110 tracked by the physical object detecting module 109 is a user's hand or hands. As such, the virtual representation 113 may be often be referred to herein as "virtual hands," although it will be understood that the virtual representation 113 may virtually represent any physical object, and is not limited to a user's hands. Indeed, as will be explained herein, the virtual representation may represent a writing implement such as a pencil or pen, a controller such as a video game or virtual reality controller, a user's face, a user's body, or other physical objects.

The presentation module 114 of computer system 101 may present the virtual item 108 (e.g., a user interface) and the virtual representation 113 of the detected physical object 110 in a display. The display may be an artificial reality device 117, a smartphone 116, a television, a computer monitor, or other type of display visible to the user 115. In some cases, the computer system 101 may be separate from the artificial reality device 117 or the smartphone 116, etc., while in other cases, the computer system (or at least some of its components or modules) may be part of the artificial reality device 117, the smartphone 116, or other electronic device. Using the artificial reality device 117 or the smartphone 116, for example, the user 115 may provide inputs 118 to the computer system including movement inputs in relation to an artificial reality interface.

However, while the movements of the virtual representation 113 within the virtual environment are generally designed to track the physical movements of the detected physical object 110, in the embodiments herein, the presentation module 114 may controllably decouple the virtual representation from the physical object's real-world movements. That is, the presentation module 114 may present the virtual representation 113 in a position that is different than that indicated by the movement of the physical object, at least in some manner and by some degree. This difference in the virtual representation from the actual movement of the tracked physical object may be based on the determined intent of that movement. For instance, if the systems herein determine that a real-world movement by a user intended to cause a certain effect within the virtual environment, that effect may be carried out within the virtual environment, regardless of whether the physical movement fully triggered that effect. These concepts will be explained further below with regard to method 200 of FIG. 2 and FIGS. 3-13F.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 2:
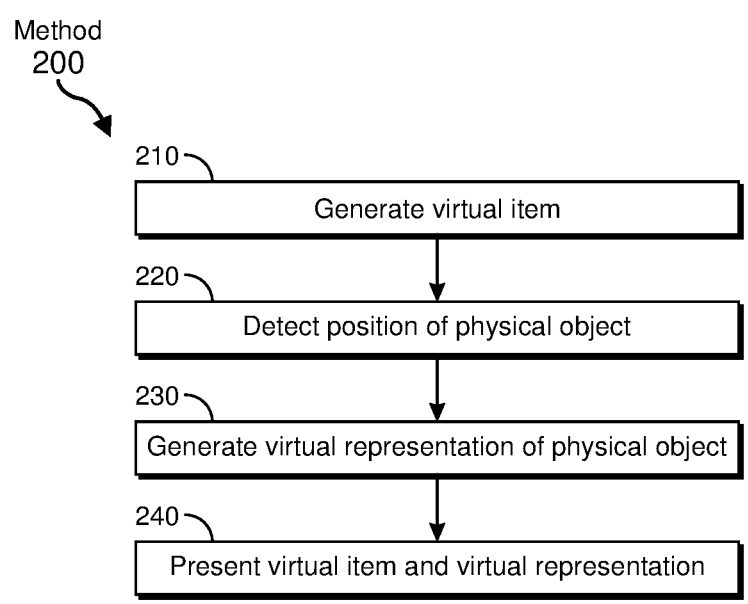
FIG. 2 is a flow diagram of an exemplary method for controllably decoupling a virtual representation of an object from the movements of the physical object.

FIG. 2 is a flow diagram of an exemplary computer-implemented method 200 for decoupling a virtual representation of an object from the movements of the physical object. The steps shown in FIG. 2 may be performed by any suitable computer-executable code and/or computing system, including the system illustrated in FIG. 1. In one example, each of the steps shown in FIG. 2 may represent an algorithm whose structure includes and/or is represented by multiple sub-steps, examples of which will be provided in greater detail below.

Figure 3:
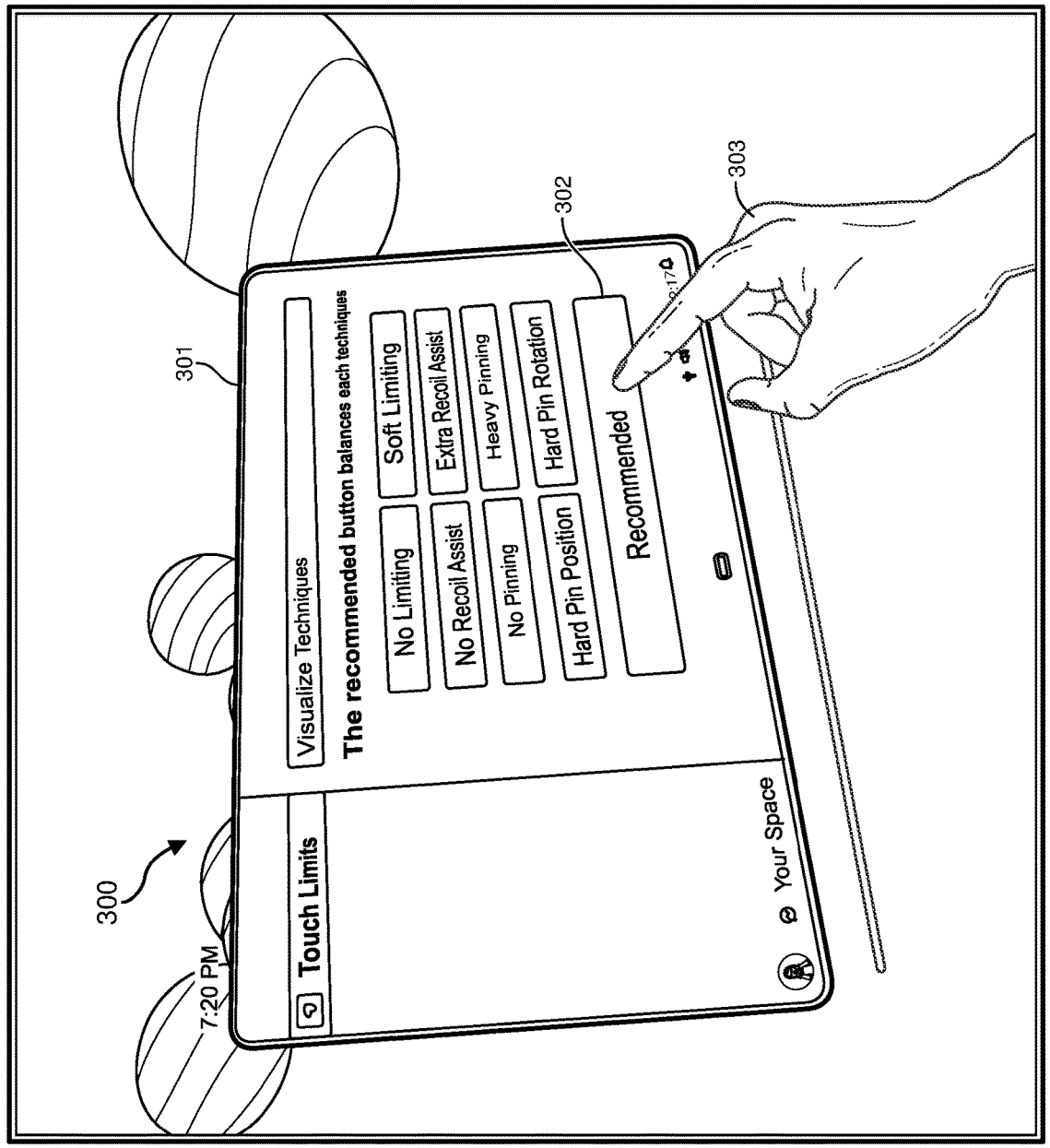
FIG. 3 illustrates an embodiment of an interface in an example virtual environment.

As illustrated in FIG. 2, at step 210, one or more of the systems described herein may generate a virtual item within a virtual environment. For example, as shown in FIG. 1, the virtual environment generating module 107 of computer system 101 may generate a virtual environment 300 as shown in FIG. 3. The virtual environment 300 may include many different virtual items 108 including user interface 301. As noted above, the virtual environment 300 may include substantially any number of virtual items 108, and these items may or may not correspond to real-world items. In some cases, the virtual items 108 are placed in a fixed position within the virtual environment, while in other cases, the virtual items may be moved around and repositioned, for example, based on inputs 118 from user 115. In FIG. 3, the user interface 301 may include multiple different buttons (e.g., 302) or other interactive elements. These interactive elements may allow interaction with various software applications that may be running on the artificial reality device 117, on the smartphone 116, on another electronic device.

The physical object detecting module 109 of computer system 101 may detect, at step 220 of method 200, a current position of at least one physical object 110 that is to be portrayed within the virtual environment 300. The physical object detecting module 109 may detect the physical object 110 and its position 111 and/or movements using various hardware sensors including, without limitation, cameras, accelerometers, gyroscopes, piezoelectric sensors, electromyography (EMG) sensors, or other types of sensors. The physical object(s) 110 detected by module 109 may include a user's left hand, a user's right hand, a user's fingers, a user's legs, feet, face, or other body parts, an electronic controller held by a user, a writing implement such as a pen or pencil held by the user, a paintbrush or other tool held by a user, or substantially any other physical object. While many examples herein may refer to tracking a user's hands, it will be understood that the physical object may be a single hand, multiple hands, a portion of a hand, or a portion of any other body part or other object that is detectable by the physical object detecting module 109 of computer system 101.

At step 230 of method 200, the virtual representation generating module 112 may generate a virtual representation 113 of the physical object 110 within the virtual environment 300. The virtual representation 113 of the physical object 110 may be configured to at least partially follow movements of the physical object relative to the virtual item (e.g., user interface 301). Thus, for example, as the physical object detecting module 109 tracks movements of user 115's hands, for example, the virtual representation 113 of those hands may be shown in the virtual environment 300. Thus, virtual hand 303 may be generated by the virtual representation generating module 112 to represent the user's real-world right hand and its movements in relation to the user interface 301. However, as will be shown below, the embodiments herein may controllably decouple the physical hand from the virtual representation 113 of that hand. This controlled decoupling may provide additional sensory information that may feel to the user as though they were interacting with an actual physical object. Embodiments depicting such are described further below.

At step 240 of method 200, the presentation module 114 of computer system 101 may present the virtual item 108 and the generated virtual representation 113 of the physical object 110 within the virtual environment 300. The virtual representation 113 of the physical object 110 may be at least partially, controllably decoupled from the movements of the physical object relative to the virtual item 108. Thus, in FIG. 3, when a user moves their physical hand toward the virtual user interface 301, the user's physical movements may not align with the positioning of the interface. For example, the user may intend to touch button 302 on user interface 301, which may be floating at a fixed position within the virtual environment 300. The user may, however, inadvertently move their physical hand far past the fixed position of the user interface 301. This may have unintended consequences on the user interface.

For instance, the user's overreach may inadvertently select a different button than intended. Or, the user may wish to point to or select a specific item on the user interface, but may then move their hand or wrist, causing the selection point to move to an undesired location. Or, still further, the user may intend to push a button on the interface, but may move their physical hand far past the back of the interface and may then withdraw their hand to release the button. However, because the user's physical hand was so far past the back of the user interface 301, the act of unselecting the button may not occur until the user has moved their hand back to a position in front of the user interface 301. These movements may be fatiguing to users, and may cause frustration if inadvertent actions are carried out on the user interface. The examples above may be partially or entirely avoided by controllably decoupling the user's physical movements from the movements of the virtual representation (e.g., virtual hand 303) in the virtual environment 300.

Figure 4:
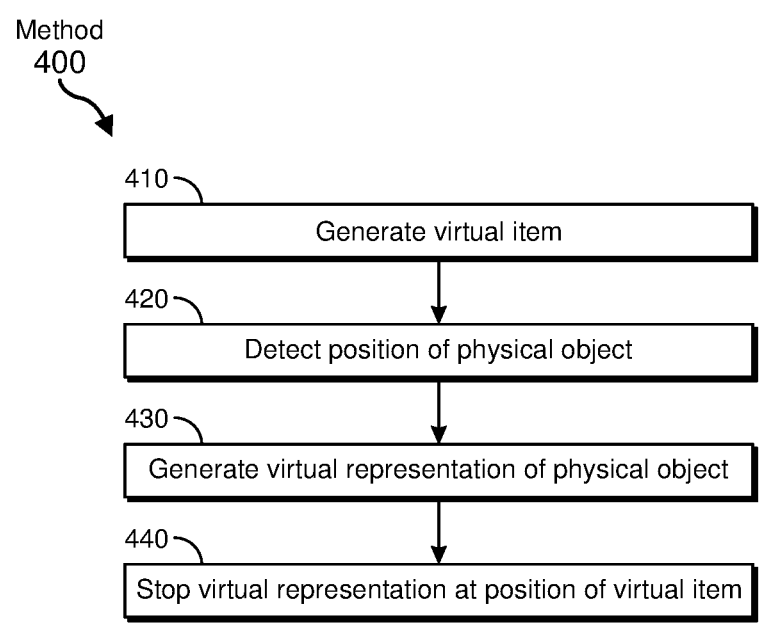
FIG. 4 is a flow diagram of an exemplary method for controllably decoupling a virtual representation of an object from the movements of the physical object, including limiting movements of the virtual representation.

FIG. 4, for example, provides a flow diagram of an exemplary computer-implemented method 400 for decoupling a virtual representation of an object from the movements of the physical object by stopping the virtual representation at a specified position with respect to virtual items. The steps shown in FIG. 4 may be performed by any suitable computer-executable code and/or computing system, including the system illustrated in FIG. 1. In one example, each of the steps shown in FIG. 4 may represent an algorithm whose structure includes and/or is represented by multiple sub-steps, examples of which will be provided in greater detail below.

At step 410, the virtual environment generating module 107 may generate a virtual item (e.g., user interface 501 of FIG. 5A) that has a specified position within a virtual environment 500. At step 420, the physical object detecting module 109 may then detect, using various hardware sensors, a current position 111 of at least one physical object 110 that is to be portrayed within the virtual environment 500. At step 430, the virtual representation generating module 112 may generate a virtual representation 113 of the physical object 110 within the virtual environment 500. The virtual hand 503 of FIG. 5A, for example, may be a representation of a user's physical hand. The virtual hand 503 may be configured to at least partially follow movements of the user's physical hand relative to the virtual user interface 501. At step 440, the physical object detecting module 109 may then determine that a detected movement of the user's hand would move the virtual representation of the physical object (e.g., the virtual hand 503) past the specified position of the virtual user interface 501. At step 450, the presentation module 114 may then present the virtual user interface 501 and the generated virtual hand 503 within the virtual environment 500. Within this presentation, however, the virtual hand 503 is configured to at least partially stop at the specified position of the virtual user interface 501, regardless of how far the user moves their physical hand past the position of the virtual user interface 501.

Figure 5A:
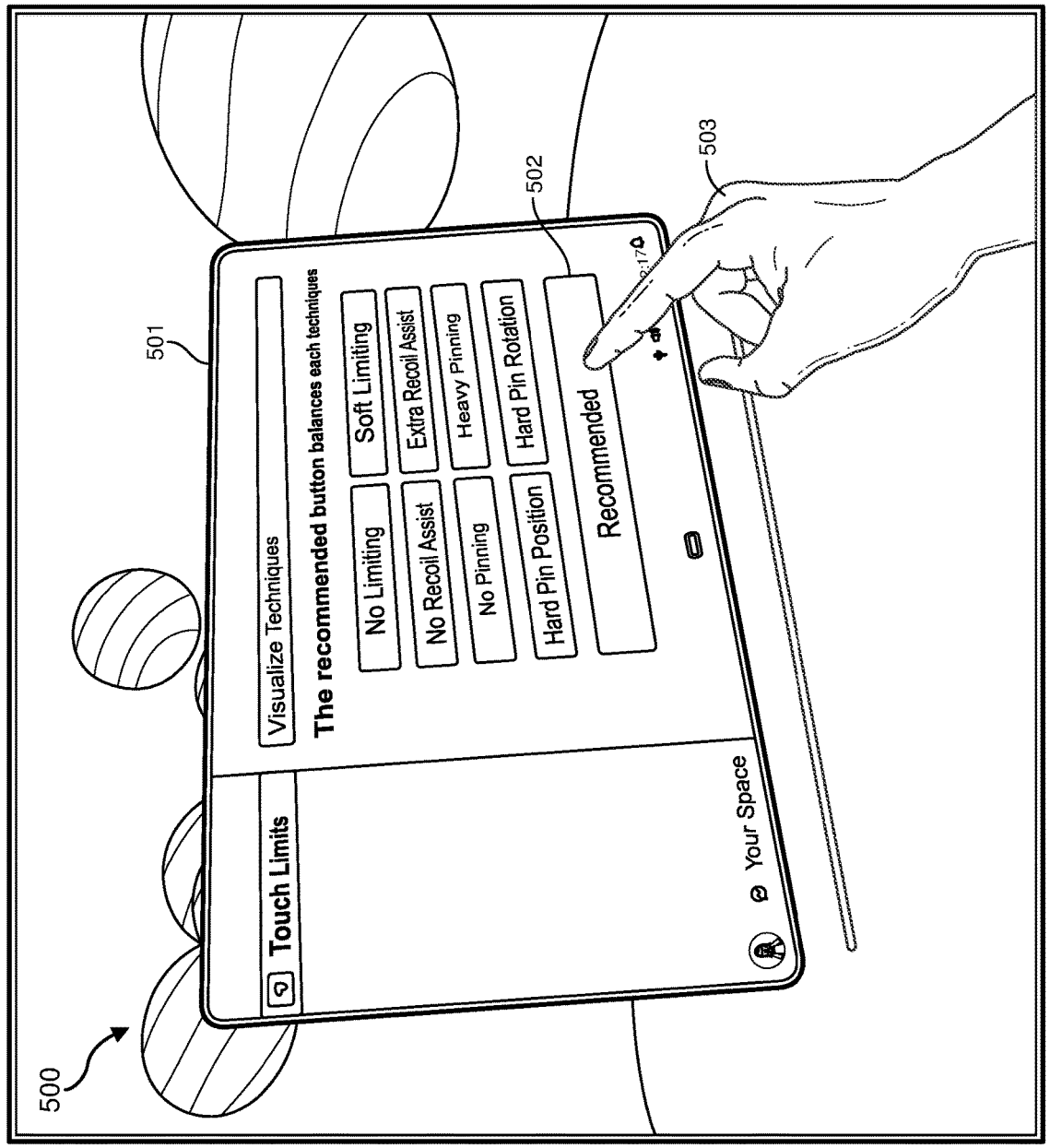
FIGS. 5A-5C illustrate embodiments in which specified limits are applied to a virtual representation when contacting a surface in a virtual environment.
Figure 5B:
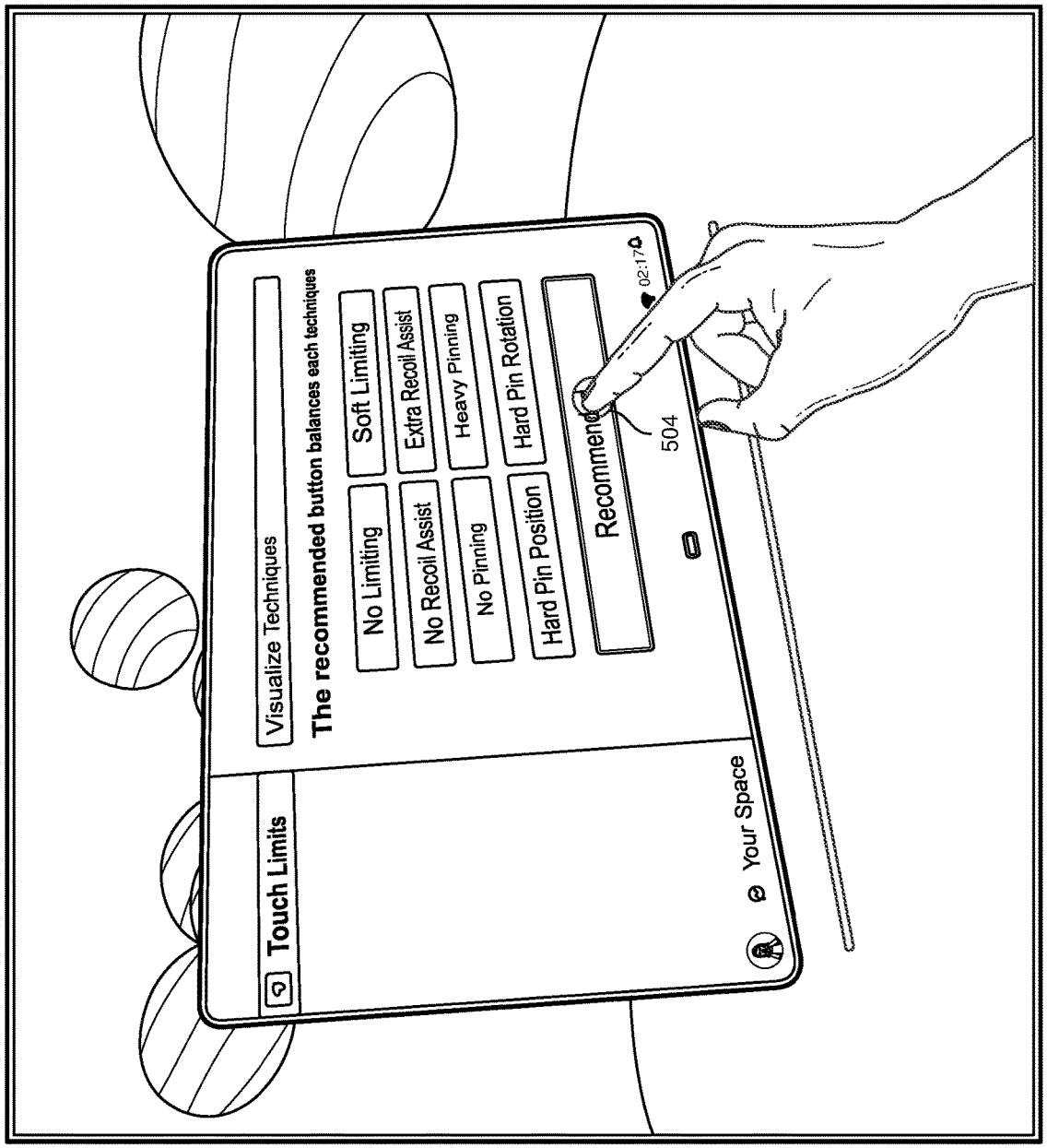

For example, as shown in FIG. 5A, a virtual hand 503 may be illustrated interacting with the virtual user interface 501. In FIG. 5A, the virtual hand 503 can be seen moving toward user interface button 502. In FIG. 5B, the virtual hand 503 has reached the virtual user interface (UI) button 502 and has selected that button (as evidenced by the button's change in color). Still further, upon "contacting" the virtual surface of the user interface 501 (or the surface of some other virtual item 108), the virtual environment 500 may display an affordance 504 that helps the user know where they have contacted the user interface. Within the virtual environment 500, a virtual object may contact another virtual object when the tracked physical object has moved its virtual representation sufficiently close to the other virtual object. However, movements past the virtual object may be interpreted incorrectly, and may register unintended inputs.

Figure 5C:
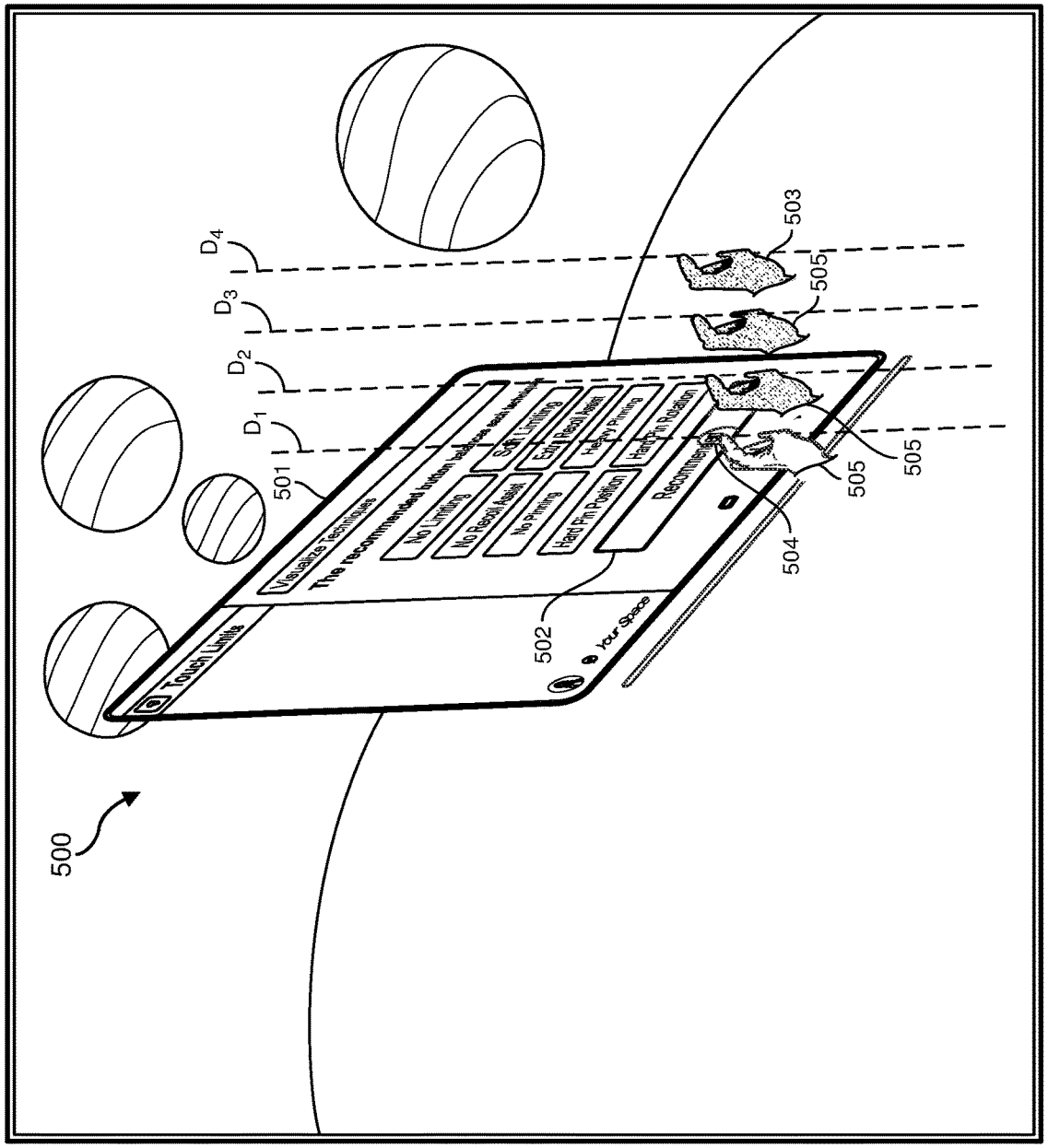

The embodiments described herein may be configured to stop (or at least temporarily stop) the virtual representation at the surface of the virtual item, regardless of how far past the surface of the virtual item the physical object travels. For instance, as shown in FIG. 5C, at distance D1, the user's physical hand 505 and the virtual hand 503 may both be substantially at the surface of the virtual user interface 501. In at least some of the embodiments herein, even if the user moves their physical hand 505 to distance D2 beyond the surface of the virtual user interface 501, the virtual hand may remain stopped at its position touching the surface of the virtual user interface 501. Thus, in such cases, even if the user provides movements that would otherwise move the virtual hand 503 past the virtual user interface 501, the systems herein may controllably decouple the movements of the user's physical hand 505 from the movements of the virtual hand 503, and may allow the virtual hand 503 to remain at its position touching the surface of the virtual user interface 501, instead of pushing through the virtual user interface 501. In such embodiments, this may hold true even if the user moves their physical hand to distances D2, D3, D4, or beyond D4. Such embodiments may be referred to as "hard stop" embodiments.

Figure 6A:
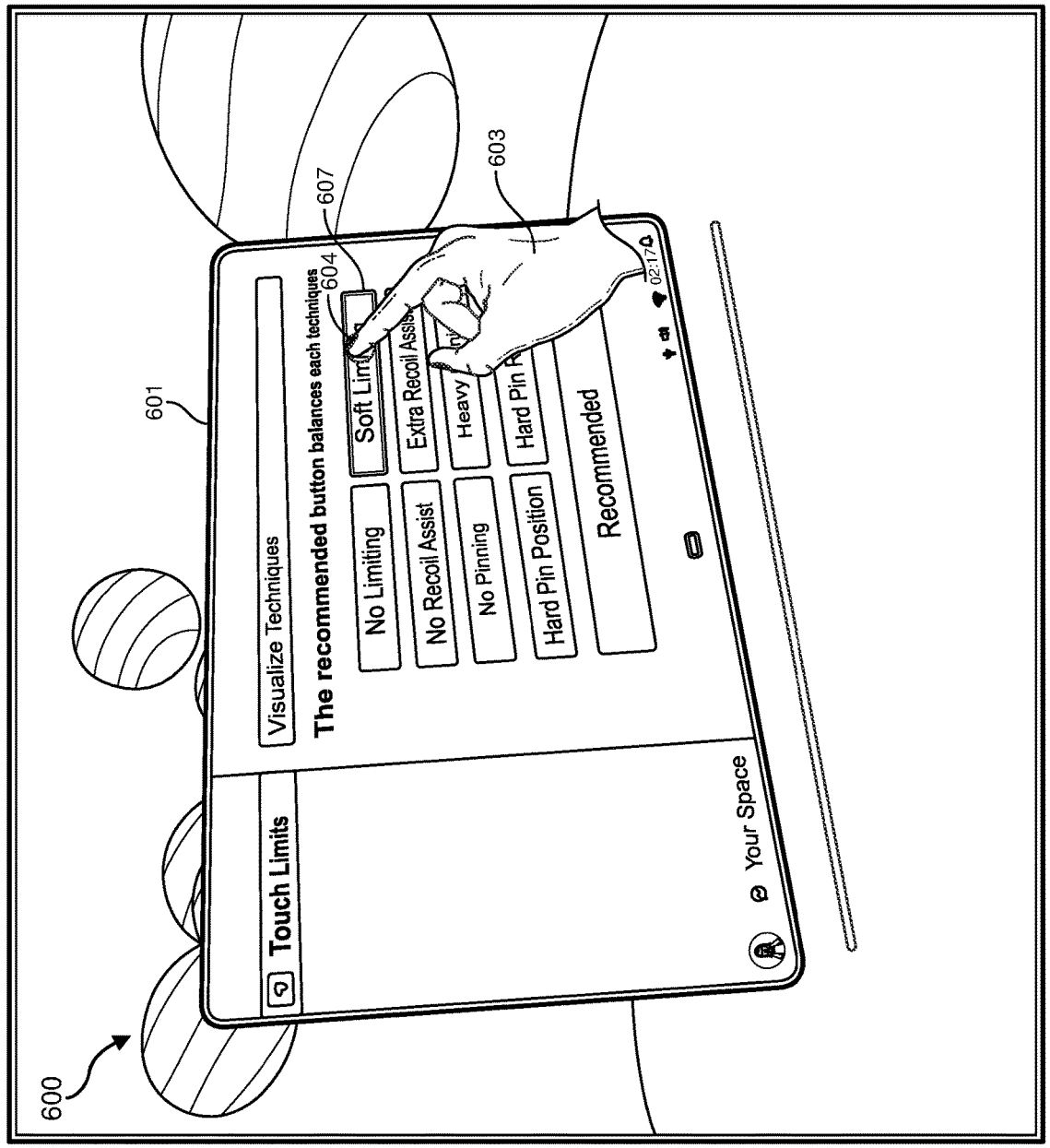
FIGS. 6A-6C illustrate embodiments in which alternative specified limits are implemented when contacting a surface in a virtual environment.
Figure 6B:
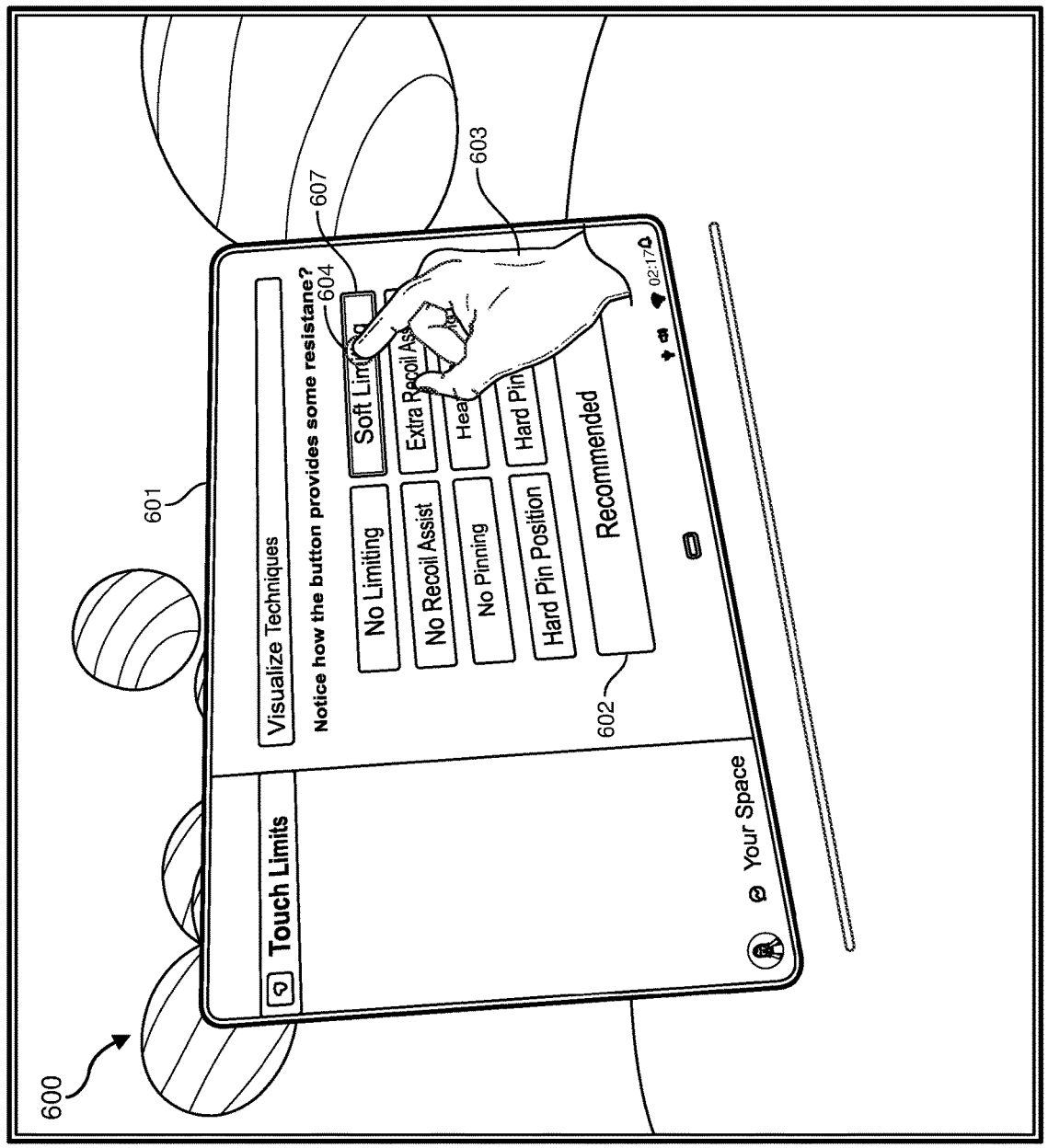
Figure 6C:
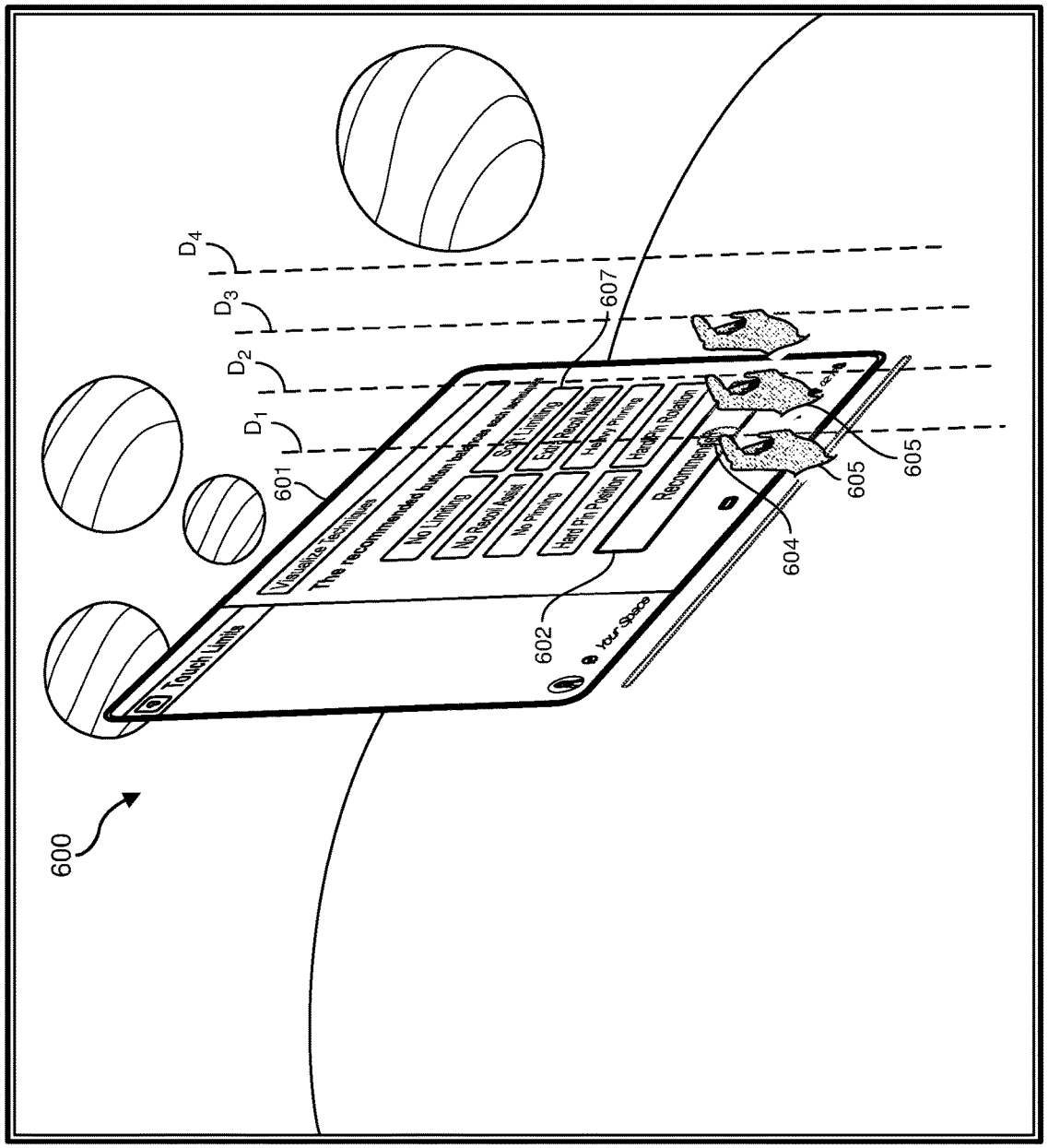

Additionally or alternatively, the systems herein may be configured to apply a less rigid limit in "soft stop" embodiments. For example, in FIG. 6A, a virtual environment 600 may have a virtual user interface 601 with various interactive elements (e.g., 602). In FIG. 6A, the user has moved their physical hand to a position that causes the virtual hand 603 to touch the button 602 (as indicated by affordance 604). However, instead of applying a hard stop regardless of how far the user's hand moves past the virtual user interface 601, the soft stop embodiments may only stop the virtual hand from moving up to a specified point. For example, in some cases, as shown in FIG. 6B, if the user moves their physical hand far enough past the virtual user interface 601, the systems herein may interpret those movements as the user intending to move the virtual hand past the virtual user interface 601 and potentially to a different virtual item in the virtual environment 600 (as indicated by the finger of the virtual hand 603 beginning to disappear behind the virtual user interface 601). Thus, as shown in FIG. 6C, the virtual hand 603 may be controllably decoupled from the user's physical hand 605, such that if the user's physical hand is at positions D1 or D2, the virtual hand will be stopped in its current position and, if the user moves their hand to positions D3 or D4, the virtual hand will no longer be stopped and will begin to move past the virtual user interface 601.

The amount of distance needed to cause the virtual hand to move after being stopped may be controlled by policies (e.g., policies 121 stored in data store 120 of FIG. 1), or may be specified by a user. These policies 121 may vary based on which type of virtual object a user is interacting with. Thus, some interfaces or surfaces may have a very short amount of distance (e.g., D1-D4) beyond which the virtual object will no longer be stopped, while other interfaces or surfaces may have a very large amount of distance beyond which the virtual object will not longer be stopped from moving. Thus, interactions with each surface in a virtual environment may be unique. Some surfaces may stop the virtual hand 603 at their surface regardless of further physical hand movements (e.g., a hard stop). Other surfaces may only briefly stop the virtual hand 603 at their surface, interpreting even short distances of movement beyond their surface as the user's intent to move past the surface. The amount of stopping may be completely variable, and may be different for different virtual environments, different users, different objects or surfaces, and may be different for different physical objects including hands, controllers, pencils, paintbrushes, etc. The amount of stopping may also change over time, and may vary within each artificial reality session.

In this manner, the controlled stopping of virtual representations (e.g., virtual hand 603) at virtual items' surfaces may control or apply limits to how items are "touched" or "contacted" within a virtual environment. This touch limiting may be used to define where a virtual surface begins and ends. In one example, if the virtual item is a light switch displayed at a specified location, the systems herein may place a hard limit on the location of the virtual hand (or other virtual representation) so that even if the user's physical hand provides an input that would take the virtual hand past the virtual light switch, the virtual hand may be "touch limited" and may be configured to controllably stop on the surface of the light switch. As such, the touch of the virtual hand may be limited and may be stopped at the light switch, even if the user's physical hand would indicate movement past the light switch.

In other cases, this limit may not be a hard stop, but may be applied proportionally, so that if the user's physical hand moves past the light switch at, for instance, 5 cm past the virtual light switch, the virtual hand will continue to move. In some cases, the virtual hand 603 may move more slowly past the virtual light switch or other virtual item, giving the feeling that the virtual hand is touching a thick substance like dough. If the user's physical hand moves to 10 cm, for example, past the virtual light switch, the virtual hand may move fully through the virtual light switch and into open space or onto another virtual object behind the virtual light switch. Thus, the touch limiting may be applied in a fully on manner (hard stop), or in a proportional manner (soft stop) that allows touch limiting to occur for specific movements close to the virtual item, but to cease once the movements have moved sufficiently past the virtual item.

In some cases, when a user is initially learning to interact with an artificial reality interface, the user may provide movements with their hands and/or arms, and the physical object detecting module 109 of computer system 101 may track those movements and determine how the virtual representation 113 is to be moved relative to each virtual item 108. As the user uses their hand, for example, to interact with an interface, the computer system 101 may be informed of the user's preferences directly by the user, or may learn the user's preferences regarding touch limiting over time. Thus, the amount of decoupling between the user's movements and the amount the virtual representation correspondingly moves (or doesn't move) may change and may be adaptable over time. These changes may occur based on inputs from the user, or based on machine learning algorithms, for example, that monitor the user's movements and determine the user's intention with respect to each virtual item. The user may specify the amount of decoupling (e.g., a very loose coupling between physical movements and virtual movements, or a very tight coupling that results in a nearly one-to-one correlation between physical movements and virtual representation movements), or the underlying system may specify the amount of decoupling. This amount of decoupling may be different for each user and for each virtual and/or physical object, and may be specified in a controlling policy (e.g., 121).

In the example of method 400, the systems herein may be configured to prevent a virtual representation of a physical object from moving beyond a given surface of a virtual item (i.e., the surface they are contacting with the virtual representation). Controlled stops may substantially slow movement of the virtual representation at the surface of the virtual item, and then allow the virtual representation to move past the surface of the virtual item upon detecting physical movements indicating that such should occur. Additionally or alternatively, in some cases, haptic feedback may be provided to the user upon the virtual representation of the physical object reaching the surface of the virtual item within the virtual environment. This haptic feedback may be provided using any of a plurality of different haptic devices, including those described in FIG. 16 below. The haptic feedback may include physical sensations such as buzzing or vibrations that occur when the user's virtual hand, for example, touches the surface of a virtual item such as a virtual interface or virtual light switch. The haptic feedback may be provided to the user's physical hand, wrist, arm, face, head, leg, or other body part. The haptic feedback may vary in strength, depending on which type of virtual surface is being touched or where on the surface the virtual item is being touched. Moreover, the strength of the haptic feedback may vary based on whether the haptic feedback is being provided in a hard stop touch limiting embodiment, or in a soft stop touch limiting embodiment.

Figure 7:
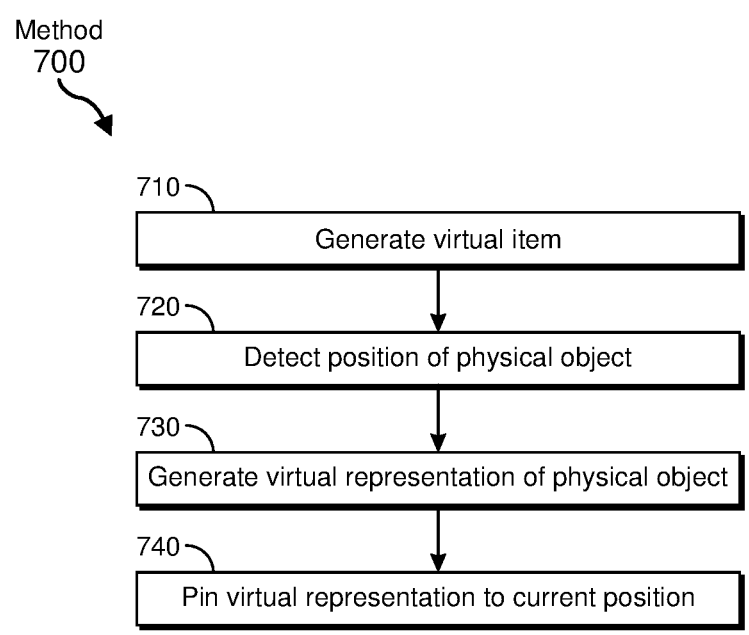
FIG. 7 is a flow diagram of an exemplary method for controllably decoupling a virtual representation of an object from the movements of the physical object, including pinning the virtual representation to a specified position.

Turning now to FIG. 7, a method 700 is provided for pinning a virtual representation to a location to simulate the friction a user would feel if performing a specified action such as scrolling through a web page or swiping between applications, even if the virtual interface is displayed in midair. For example, FIG. 7 provides a flow diagram of an exemplary computer-implemented method 700 for decoupling a virtual representation of an object from the movements of the physical object by pinning the virtual representation to a specified position on a virtual item. The steps shown in FIG. 7 may be performed by any suitable computer-executable code and/or computing system, including the system illustrated in FIG. 1. In one example, each of the steps shown in FIG. 7 may represent an algorithm whose structure includes and/or is represented by multiple sub-steps, examples of which will be provided in greater detail below.

At step 710 of method 700, the virtual environment generating module 107 of FIG. 1 may generate a virtual item 108 that has a specified position within a virtual environment. For example, the virtual environment generating module 107 may generate virtual user interface 801 within virtual environment 800 of FIG. 8. The virtual user interface 801 may be in a fixed (floating) position within the virtual environment, or may be movable by a user within the virtual environment. At step 720 of method 700, the physical object detecting module 109 of FIG. 1 may detect, using various hardware sensors, a current position 111 of at least one physical object 110 that is to be portrayed within the virtual environment 800. Thus, in one example, the physical object detecting module 109 may detect the position of a user's physical hand with respect to the current position of the virtual user interface 801 (or other virtual item 108).

At step 730 of method 700, the virtual representation generating module 112 of FIG. 1 may generate a virtual representation 113 of the physical object 110 within the virtual environment 800. In such cases, the virtual representation 113 of the physical object 110 may be configured to at least partially follow movements of the physical object relative to the virtual user interface 801 or other virtual item. In some cases, for instance, the virtual representation 113 of the physical object 110 may be configured track substantially any movements of the physical object relative to the virtual user interface 801, but may controllably avoid moving the virtual representation in line with those tracked movements. For instance, the computer system 101 may determine that a detected movement of the physical object 110 would move the virtual representation 113 of the physical object laterally with respect to the virtual item. Then, at step 740 of method 700, the presentation module 114 may present the virtual item 108 and the generated virtual representation 113 of the physical object within the virtual environment, where instead of tracking each motion of the physical object verbatim, the virtual representation of the physical object may remain pinned to the detected current position of the physical object relative to the virtual item.

Figure 8A:
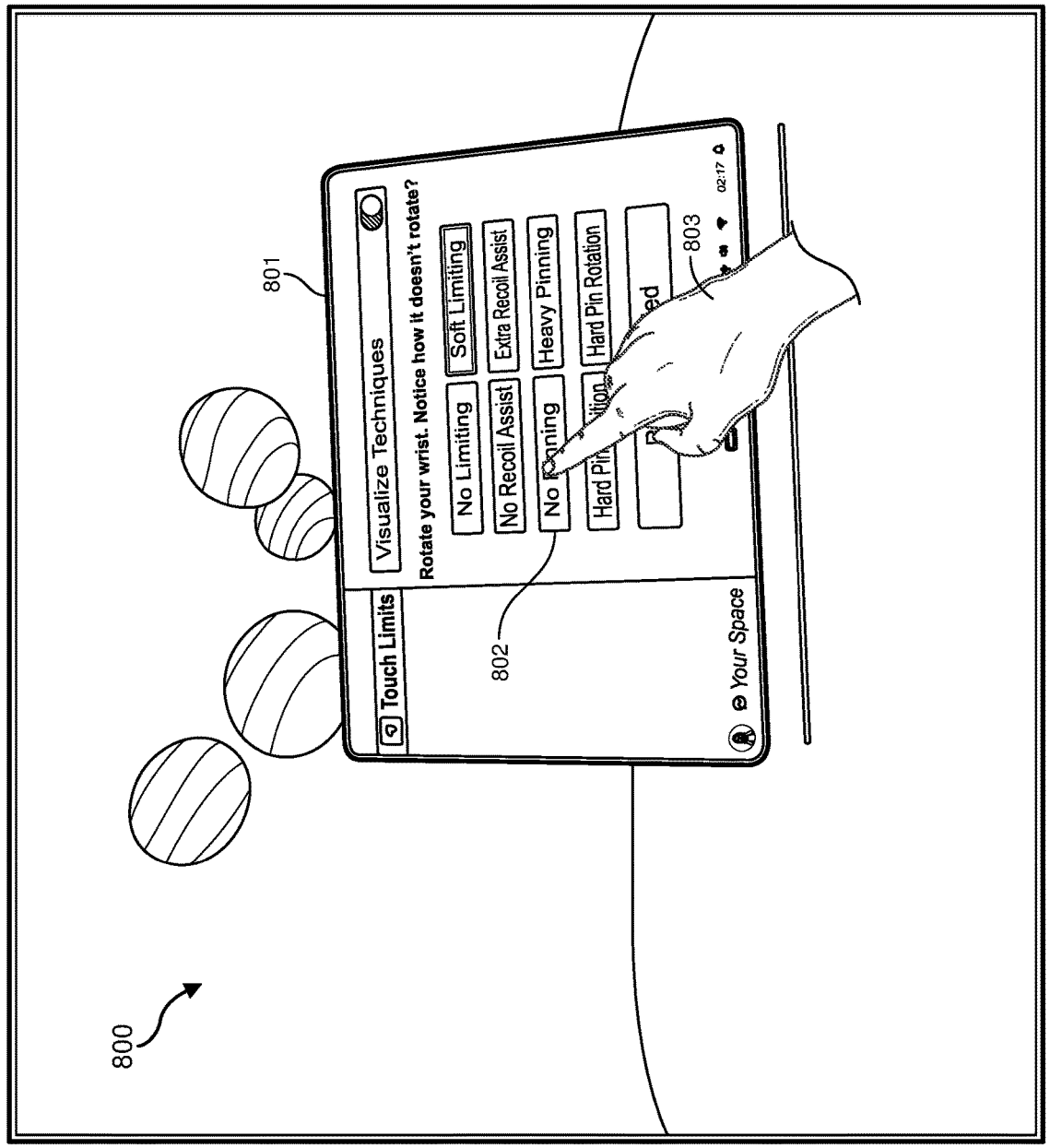
FIGS. 8A-8F illustrate embodiments in which a virtual representation is pinned to a specific location.
Figure 8B:
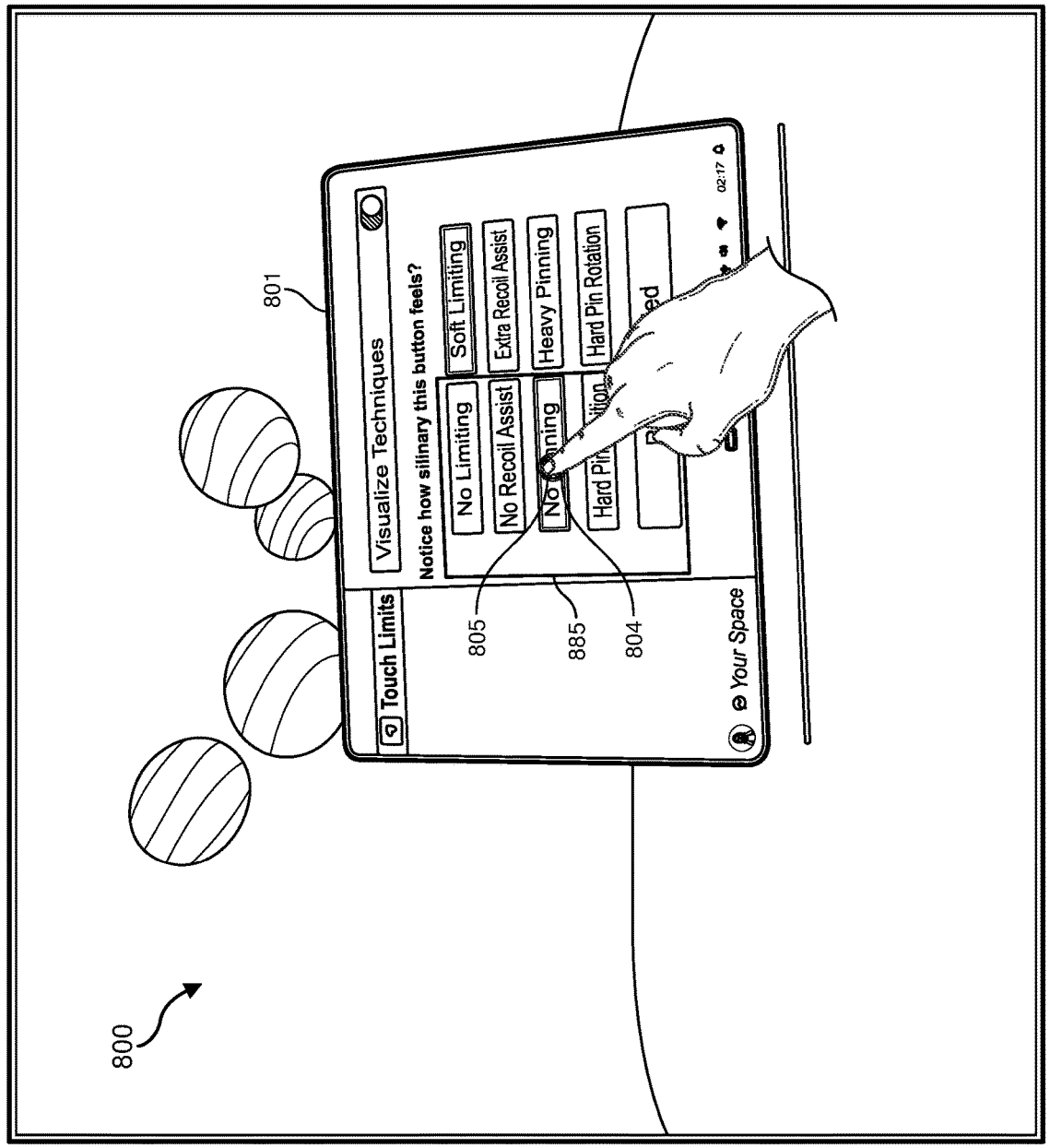
Figure 8C:
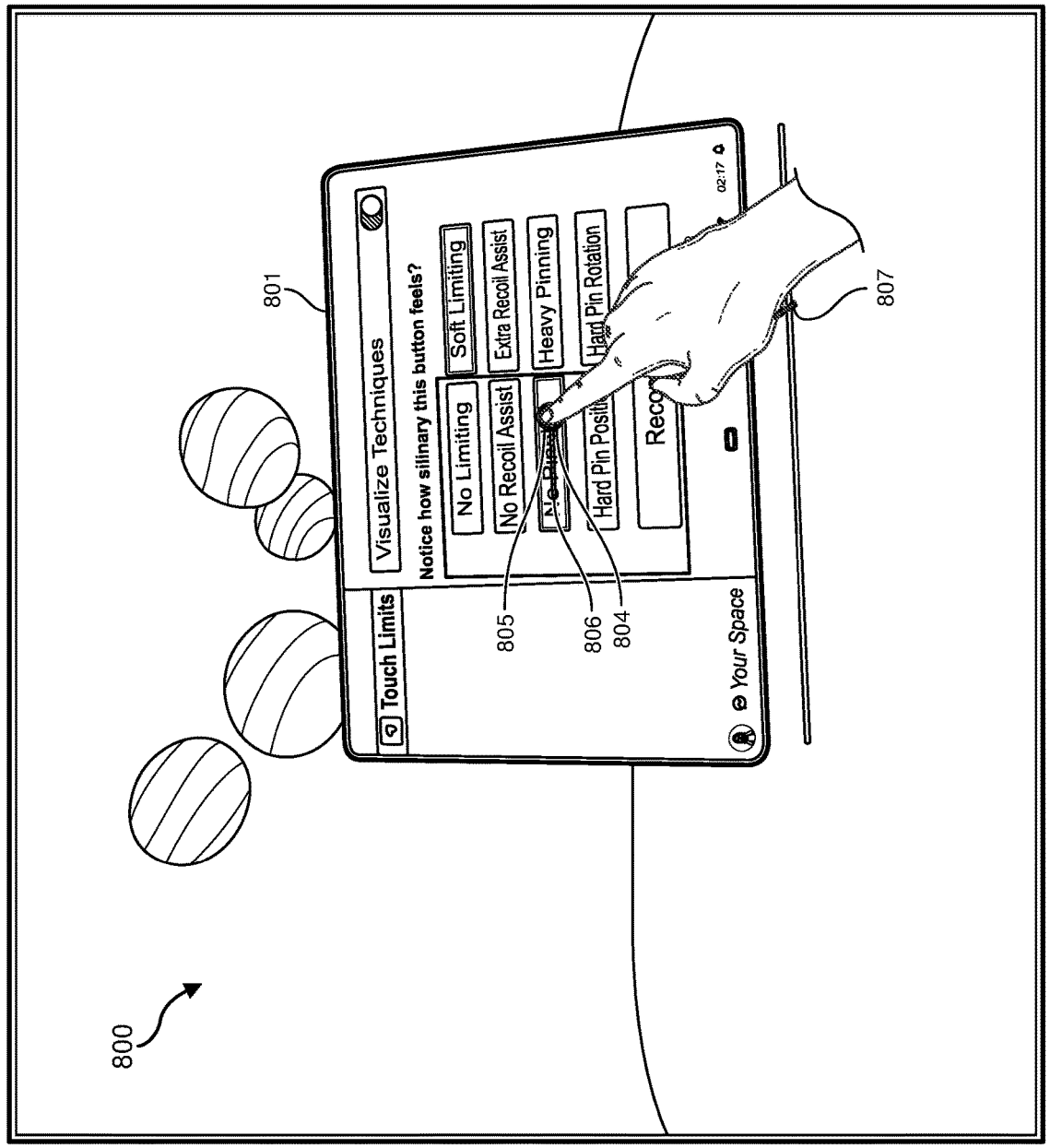

Thus, as shown in FIGS. 8A-8F, the controllable decoupling between the user's physical movements and the movements of the virtual representation may result in the virtual representation being pinned to a specified position relative to a virtual item. For instance, FIG. 8A illustrates a virtual user interface 801 with which a user is interacting using their hand, a controller, a writing implement, or other physical object. In FIG. 8A, the virtual representation of the user's hand (e.g., virtual hand 803) may be selecting the "No Pinning" button 802 of virtual user interface 801. Because the user has selected not to apply pinning in this embodiment, the user's virtual hand 803 will not be pinned to the current location. Thus, if the user drags their hand laterally to the right, for example, the virtual hand 803 will move along with the user's physical hand. Within FIGS. 8A-8F, the circle-shaped affordance 804 indicates where the virtual hand 803 is touching on the virtual user interface 801, and the shaded circle indicator 805 indicates where the user's physical hand is relative to the virtual user interface 801. Thus, in FIG. 8C, where no pinning is applied, when the user moves their physical hand laterally to the right (as indicated by the indicator 805), the virtual hand 803 and affordance 804 will correspondingly slide to the right, as indicated by trailing line 806. Movements of the user's wrist may also be captured and shown as indicator 807.

Figure 8D:
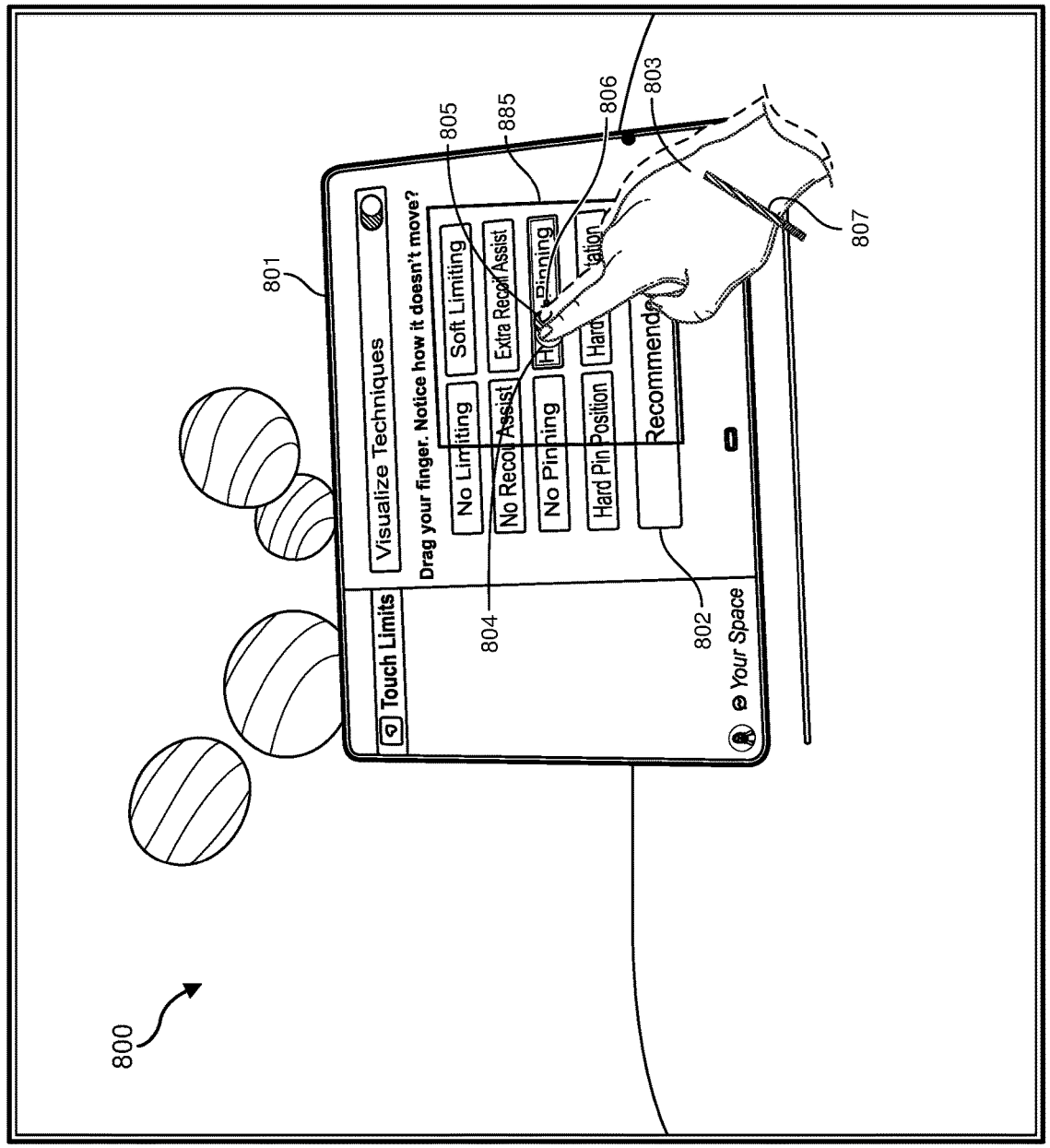
Figure 8E:
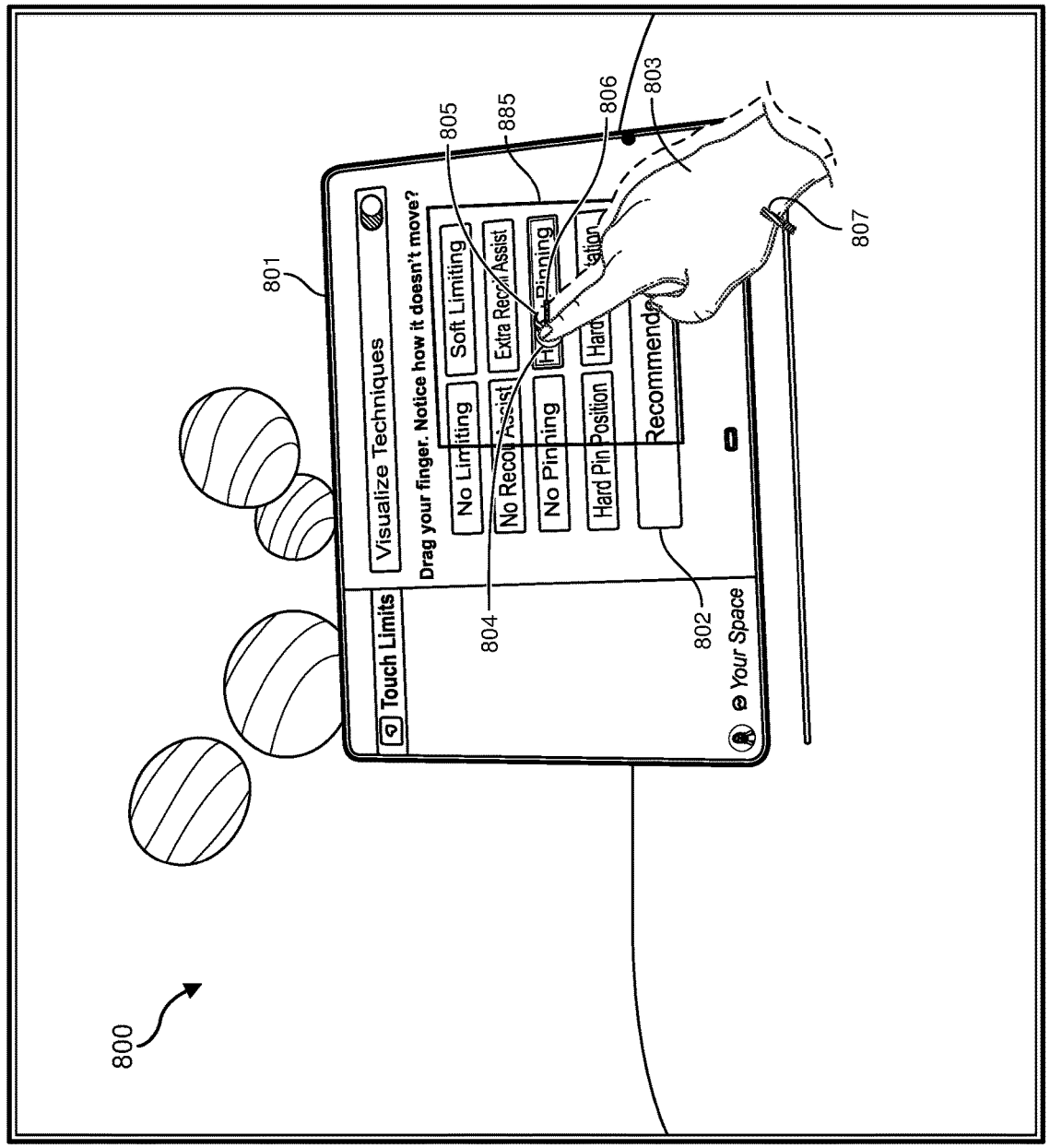
Figure 8F:
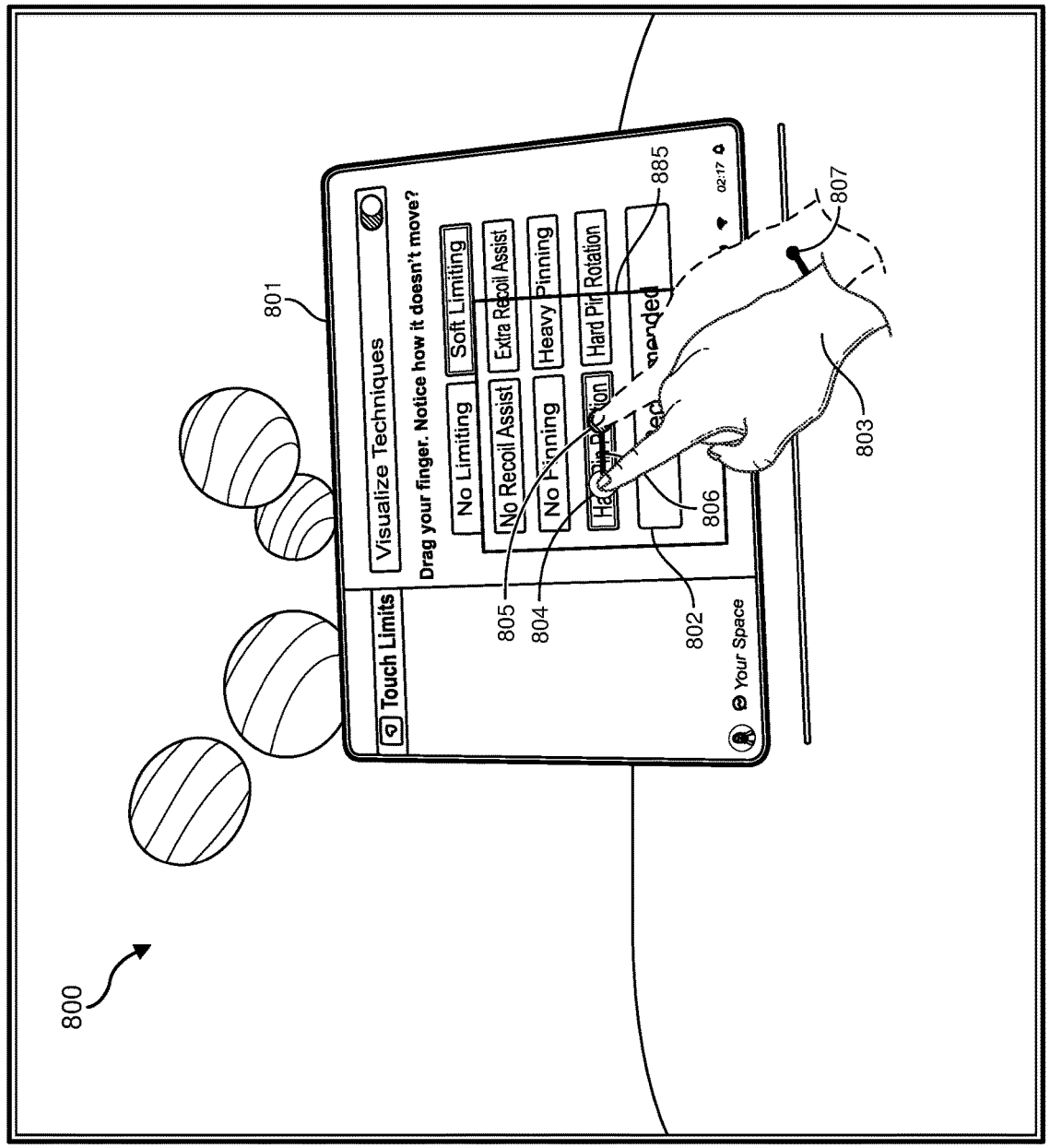

However, in cases where pinning is applied, as shown in FIG. 8D, the systems herein may determine an initial position for the user's physical hand 805 and may apply an affordance 804 to indicate where the virtual hand 803 is pointing. Even if the user moves their wrist, as evidenced by indicator 807, or moves their physical hand, as evidenced by indicator 805 in FIG. 8E, the virtual hand 803 and affordance 804 may remain in the initial position. Even if the user rotates their wrist, as shown by indicator 807 in FIG. 8F, or moves their physical finger away from an initial position, as shown by indicator 805, the virtual hand 803 and affordance 804 will remain in their initial positions.

In some cases, the pinning may be applied in a strict manner, that leaves the virtual hand 803 pinned to the initial position regardless of further physical movements. In other cases, the pinning may be applied in a less restrictive, controlled manner that allows the virtual hand to move in a trailing fashion after the movements of the physical hand. This slower trailing motion may simulate the friction the user would feel if the system were to pin the user's virtual finger to an initial touch point on the virtual interface 801 and were to slide the affordance 804 (or other virtual touch indicator) in a delayed or proportionally reduced amount than is represented by the user's actual physical movements (e.g., 805). When using pinning, the user may perceive these "higher effort" movements as friction (i.e., the friction they would feel on a physical interface). As noted above, the embodiments herein may also disconnect the user's physical wrist motions from the virtual hand 803. As such, even if the user's physical hand and wrist are rotating, the virtual environment 800 may show a virtual hand 803 that is pinned to the initial touch point and may only move in the controlled, proportionally reduced manner.

Accordingly, as illustrated in FIGS. 8A-8F, the virtual hand 803 may be controllably decoupled from the movements of the physical object relative to the virtual user interface 801. This decoupling may include moving the virtual representation of the physical object (e.g., virtual hand 803) a lesser percentage of the physical movement of the physical object. Thus, for example, large physical movements may only result in small lateral movements within the virtual environment 800 or, in other cases, small physical movements may result in large lateral movements (or potentially other movements such as orthogonal movements). The amount of disparity or decoupling may be controlled, and may follow a linear curve, an exponential curve, or a user-defined curve with tight physical movement tracking on one end, and loose physical movement tracking on the other end. FIGS. 8A-8F illustrate embodiments in which the controllable decoupling includes little to no pinning, or larger amounts of pinning, in which the virtual hand is at least initially pinned to a specific location on a virtual item (e.g., virtual user interface 801). Subsequent movements of the user's hand or other physical object may move the virtual hand 803 in a proportionally slower manner to simulate the feel of friction a user would normally feel on a physical touch-sensing surface. At least in some cases, the amount of pinning may be customizable by a user, and may apply differently to different virtual items, or to different physical objects, or to different users. Thus, unique pinning policies may be applied in each instance of a virtual environment.

In addition to touch limiting embodiments and pinning embodiments, the systems herein may also apply recoil assist when interacting with a virtual user interface or with any other type of virtual item. In such cases, for example, if a user is attempting to press a virtual button in a virtual user interface and the user physically moves their hand 10 cm past the location of a virtual button on the virtual user interface, in order to complete the button press by moving their finger 2 cm backwards, the systems herein may be configured to interpret the 2 cm backwards motion from the physical location where the user begins to retract their hand (i.e., at 10 cm past the location of the virtual UI). As such, instead of forcing the user to retract their hand 12 cm from the point of turnaround to complete the button press, the user may simply retract their hand wherever the retraction naturally occurs. This retraction or "recoil" may thus occur in a variety of locations that are not necessarily tied to the virtual UI or other virtual item. By controllably decoupling the virtual representation from the tracked physical object, the systems herein may provide recoil assist to allow interaction with objects in a natural and expected manner. This may reduce latency by allowing the retraction of the virtual hand to begin wherever the user's physical hand begins to retract (even if well beyond the virtual interface). This may also reduce user fatigue by not requiring the user to retract their hand all the way back to the virtual interface plus the distance required to deselect the virtual button. This will be explained further below with regard to method 900 of FIG. 9.

Figure 9:
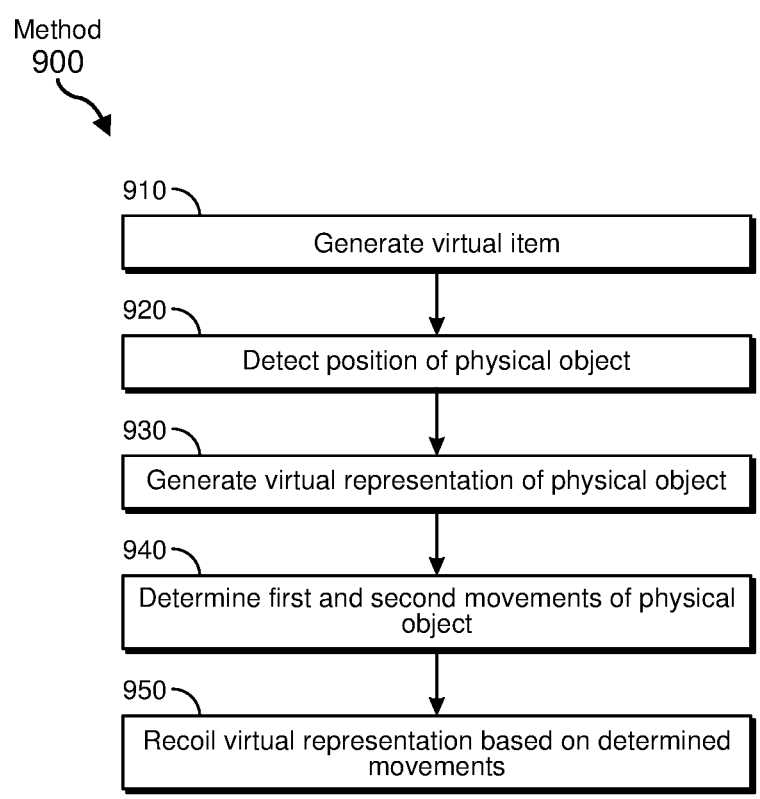
FIG. 9 is a flow diagram of an exemplary method for controllably decoupling a virtual representation of an object from the movements of the physical object, including recoiling the virtual representation in a controlled manner.

In FIG. 9, a method 900 is described for providing recoil assistance for users interacting with virtual items. For example, FIG. 9 provides a flow diagram of an exemplary computer-implemented method 900 for decoupling a virtual representation of an object from the movements of the physical object by recoiling the virtual representation in a controlled manner. The steps shown in FIG. 9 may be performed by any suitable computer-executable code and/or computing system, including the system illustrated in FIG. 1. In one example, each of the steps shown in FIG. 9 may represent an algorithm whose structure includes and/or is represented by multiple sub-steps, examples of which will be provided in greater detail below.

Figure 10A:
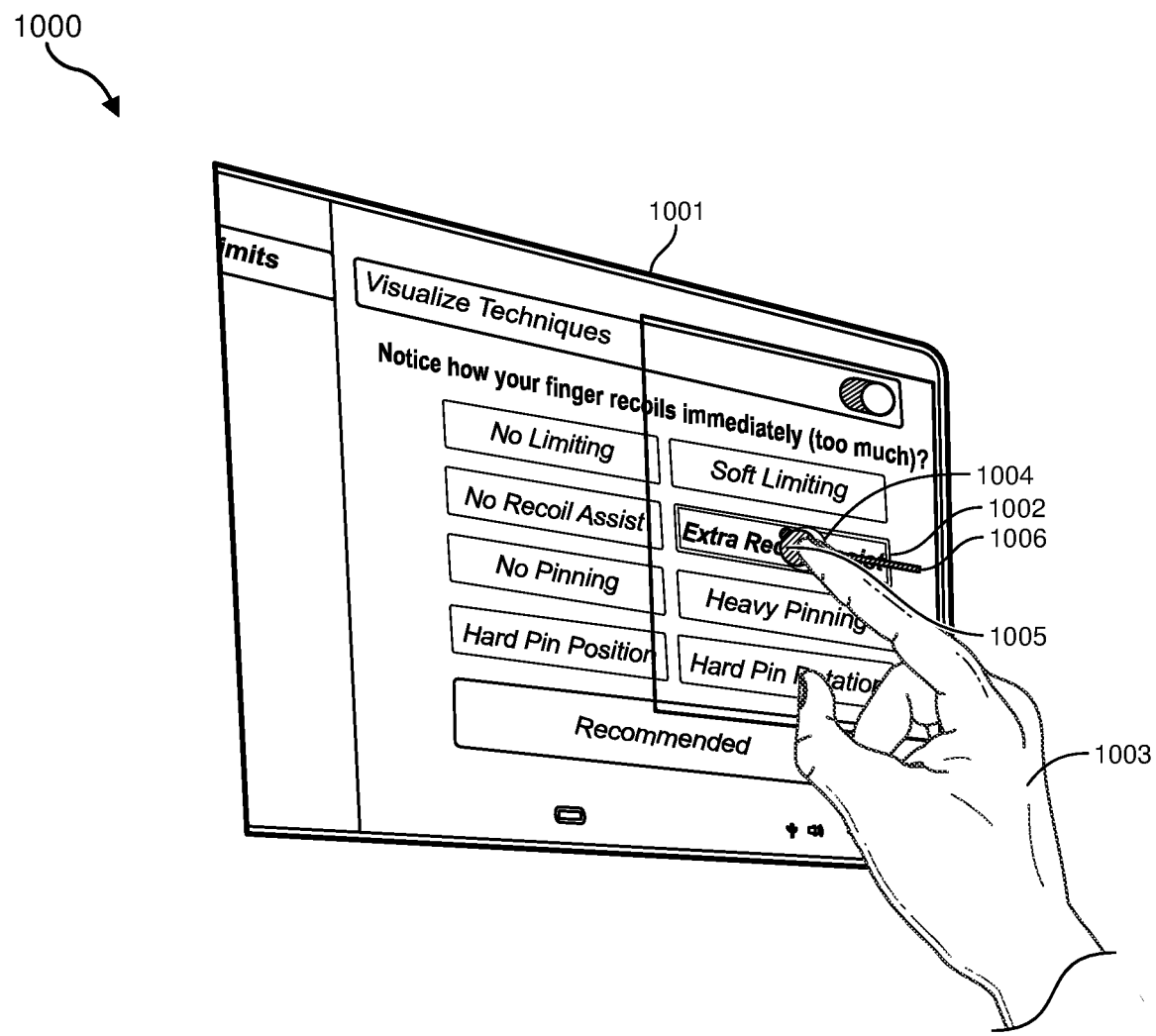
FIGS. 10A-10C illustrate embodiments in which a virtual representation recoils from a specific position in a controlled manner.

At step 910 of method 900, the virtual environment generating module 107 of FIG. 1 may generate a virtual item 108 that has a specified position within a virtual environment. For example, as shown in FIG. 10A, the virtual environment generating module 107 may generate a virtual environment 1000 that has a virtual user interface 1001 with multiple different buttons including virtual button 1002. At step 920 of method 900, the physical object detecting module 109 of FIG. 1 may detect, using various hardware sensors, a current position 111 of at least one physical object 110 that is to be portrayed within the virtual environment 1000. At step 930, the virtual representation generating module 112 may generate a virtual representation 113 of the physical object 110 within the virtual environment 1000. The virtual representation of the physical object (e.g., virtual hand 1003) may at least partially follow movements of the physical object 110 relative to the virtual item 108.

The computer system 101 may then determine, at step 940, that a first movement of the physical object 110 has moved the virtual representation of the physical object to a first position that is within a specified distance of a surface of the virtual item, and that a second movement of the physical object has moved the virtual representation of the physical object to a second position that is a specified distance closer to the surface of the virtual item. At step 950, the presentation module 114 may present the virtual item and the generated virtual representation of the physical object within the virtual environment 1000, where the virtual representation (e.g., 1003) is configured to recoil from the surface of the virtual item according to the determined first and second movements.

Figure 10B:
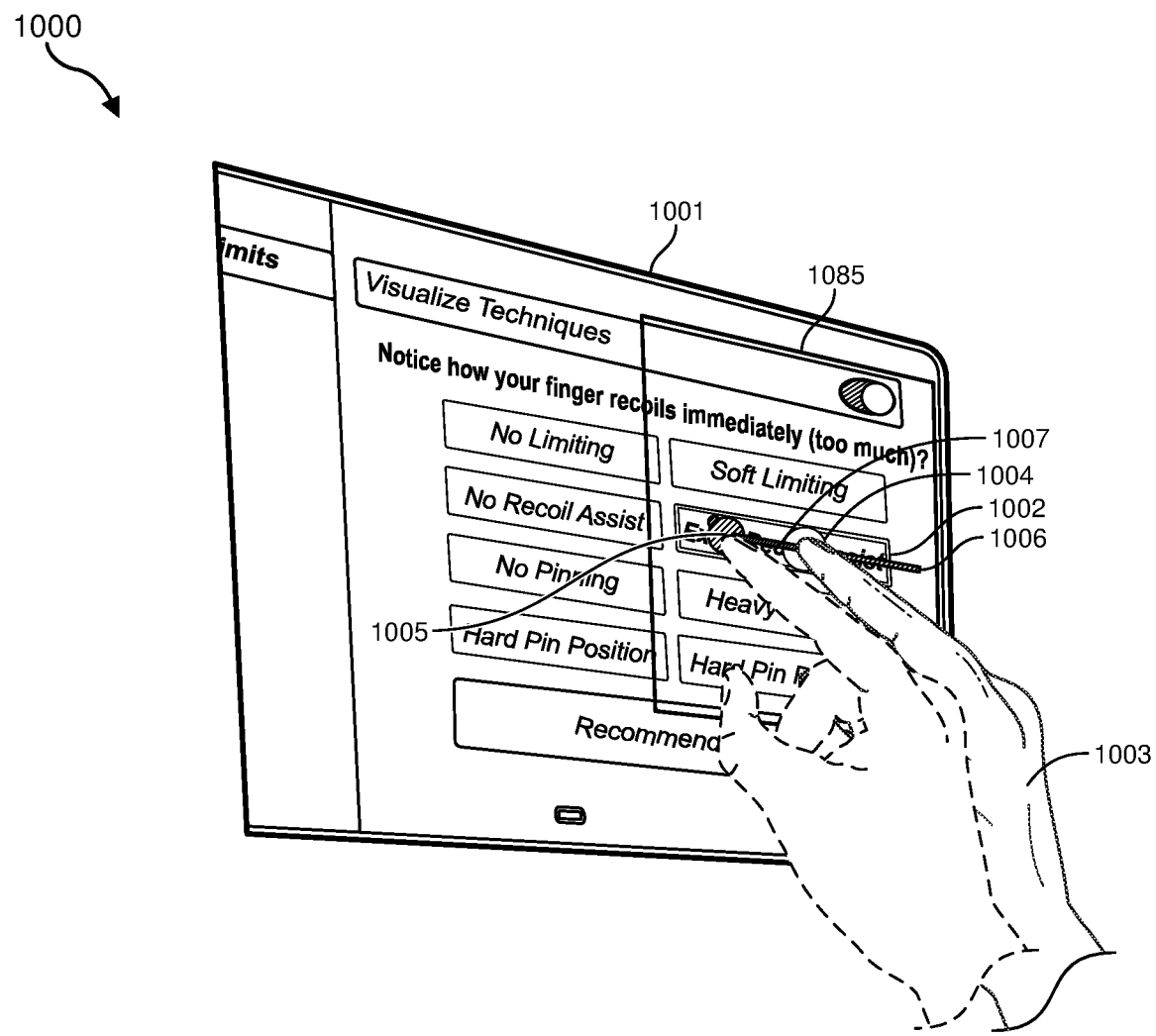
Figure 10C:
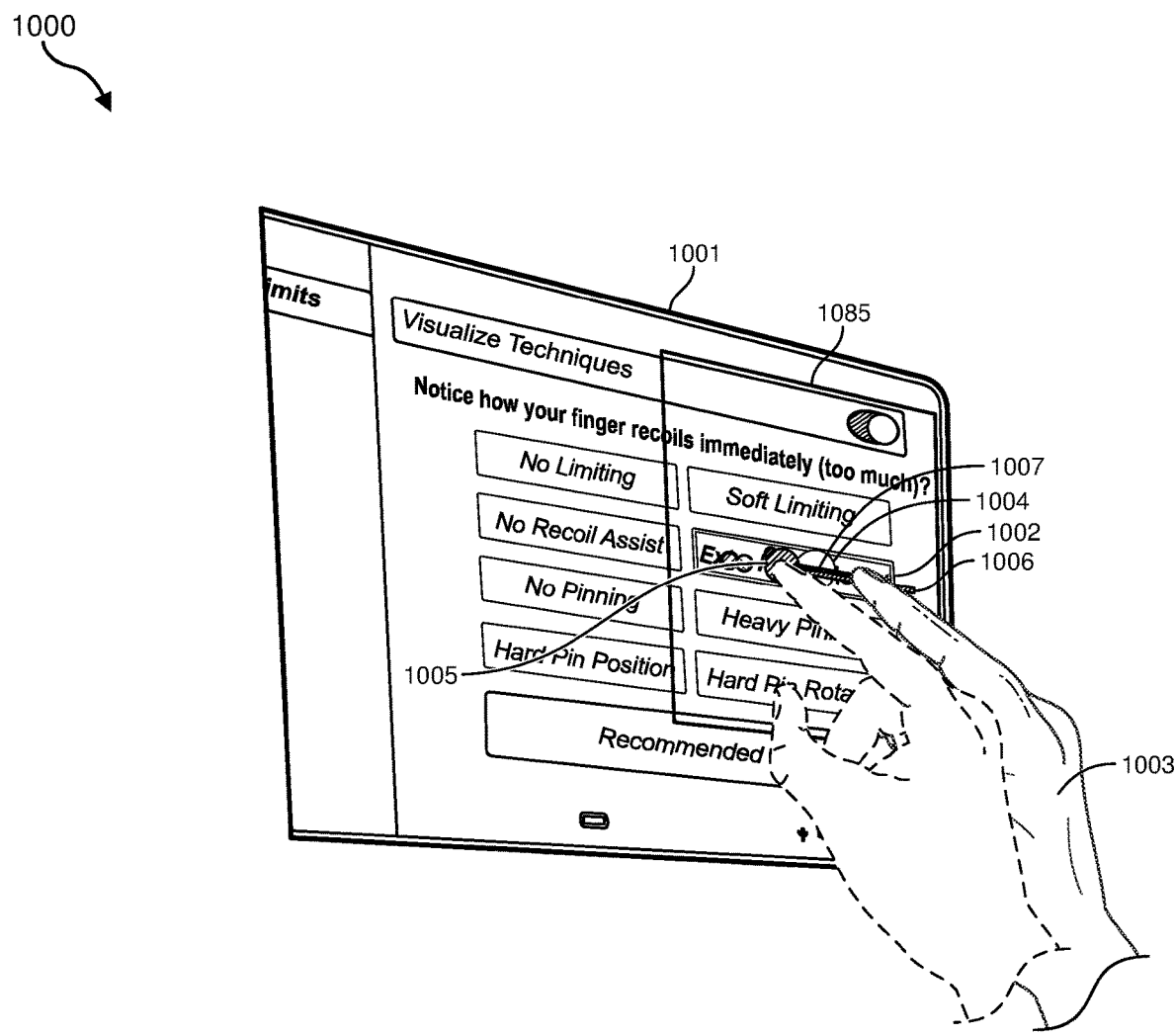

Thus, for example, as shown in FIGS. 10A-10C, a user's physical hand (as represented by shaded circle 1005) and the virtual hand 1003 (as indicated by affordance circle 1004) may have moved to substantially the same location (as indicated by path indicator 1006). If the user continues moving their physical hand beyond the virtual interface 1001, as demonstrated by movement indicator 1007 in FIG. 10B, the user may reach a point that is well beyond the position of the surface of the virtual UI 1001 (e.g., a "movement endpoint"). In such recoil assist embodiments, If the user wanted to deselect the button 1002, instead of having to move their hand all the way back to the initial position plus some distance to perform the deselection, the user may simply begin pulling back their hand, as shown in FIG. 10C, from the movement endpoint. With recoil assist enabled, the systems herein may interpret the backward or reversed motion as a recoil movement or a deselection movement. This may reduce the amount the user has to move their hand in order to provide inputs, leading to reduced fatigue and less frustration when interacting with virtual items.

FIGS. 11A-11D illustrate embodiments that allow implementation of force profiles. When force profiles are implemented, selecting a virtual item in a virtual interface (e.g., virtual button 1102 within virtual interface 1100), that virtual button may provide initial "resistance" that causes the user to move their hand an extra distance (e.g., 5 cm) to get the button to move a smaller distance (e.g., 1 cm). Thus, instead of a virtual button or other virtual item depressing linearly in line with a user's physical input, the virtual button may follow a force profile (e.g., 1101) that waits for a specified input force before registering a selection. In the various force profiles (e.g., 1101) of FIGS. 11A-11D, the X axis may represent a physical position relative to a button's original compression point at 0 m. The Y axis may represent the mapped, virtual position of the hand, where 0 m is the effective button compression point. In force profile 1101 of FIG. 11A, for example, a user may move their finger from −0.05 m to 0.1 m before a button click will be registered, and may move their finger from 0.1 m to 0.2 m before another click is registered. Thus, instead of immediately registering as a button click, the force profile 1101 or "force curve" may cause the user to move their hand further, making the action feel as if it has weight. Indeed, some force profiles may cause virtual objects to feel heavier or lighter, or feel like they have multiple states (e.g., a (virtual) multi-mode toggle switch).

Figure 11A:
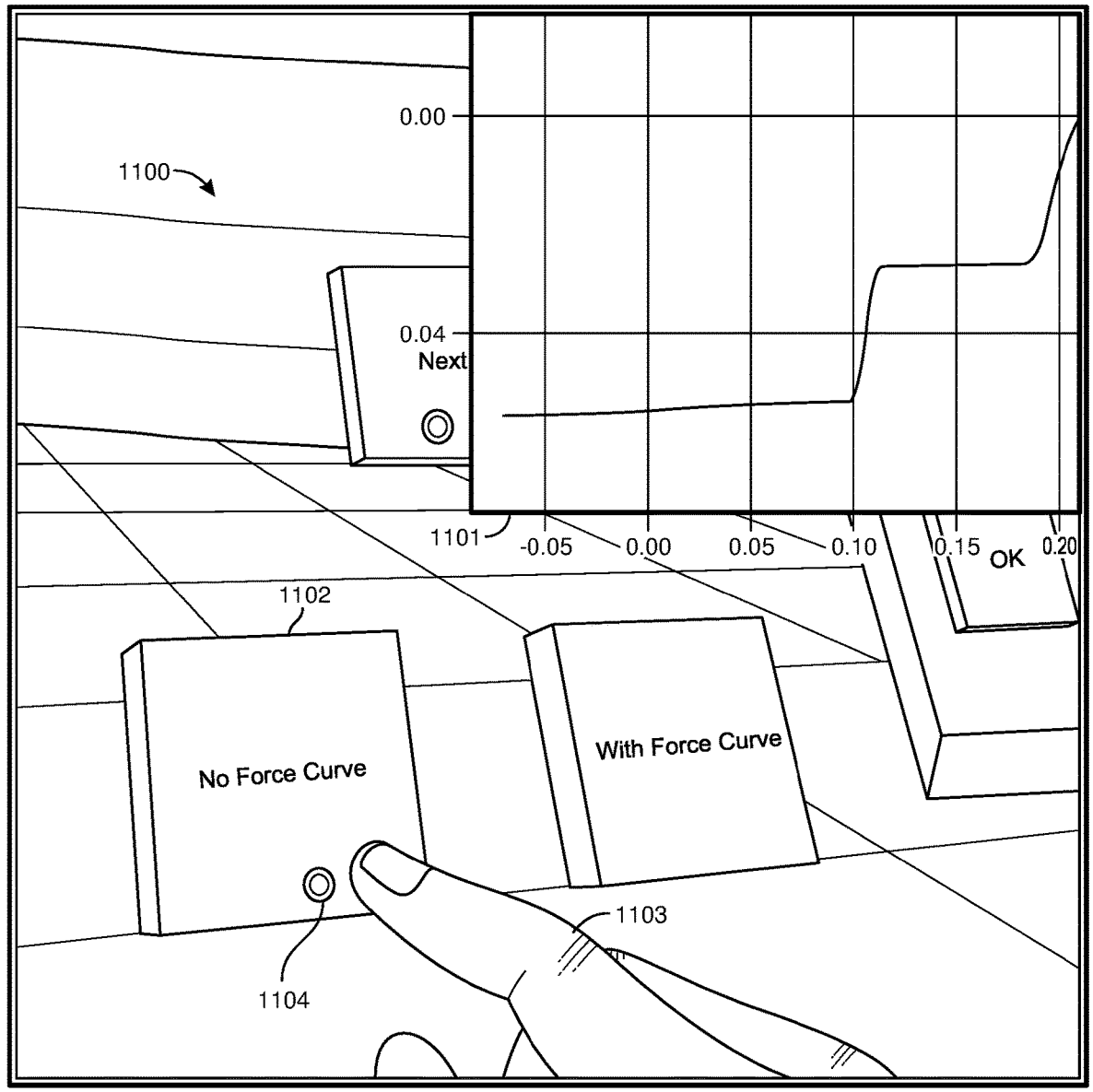
FIGS. 11A-11D illustrate embodiments in which specified force curves are applied when interacting with a virtual interface.
Figure 11B:
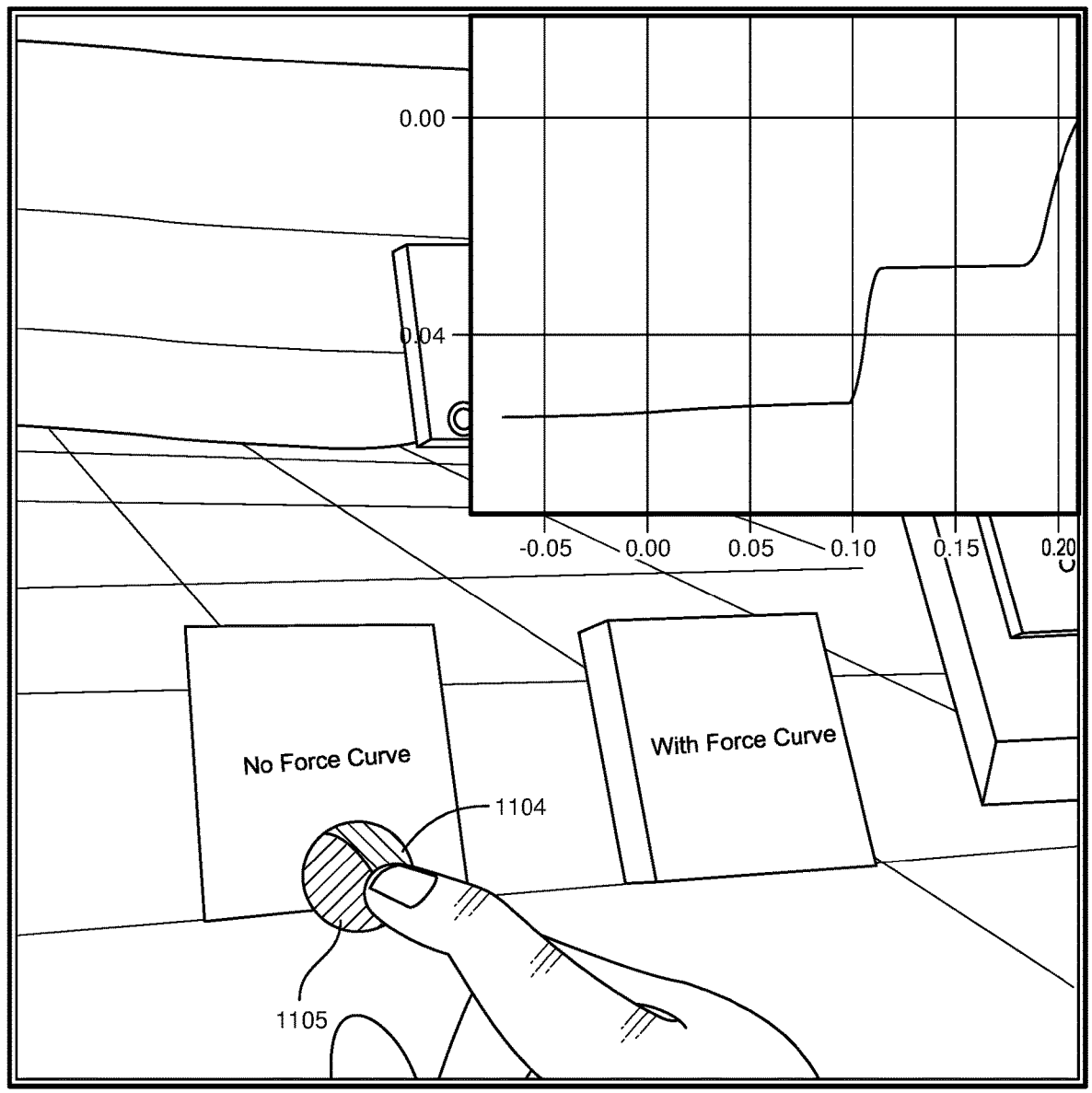
Figure 11C:
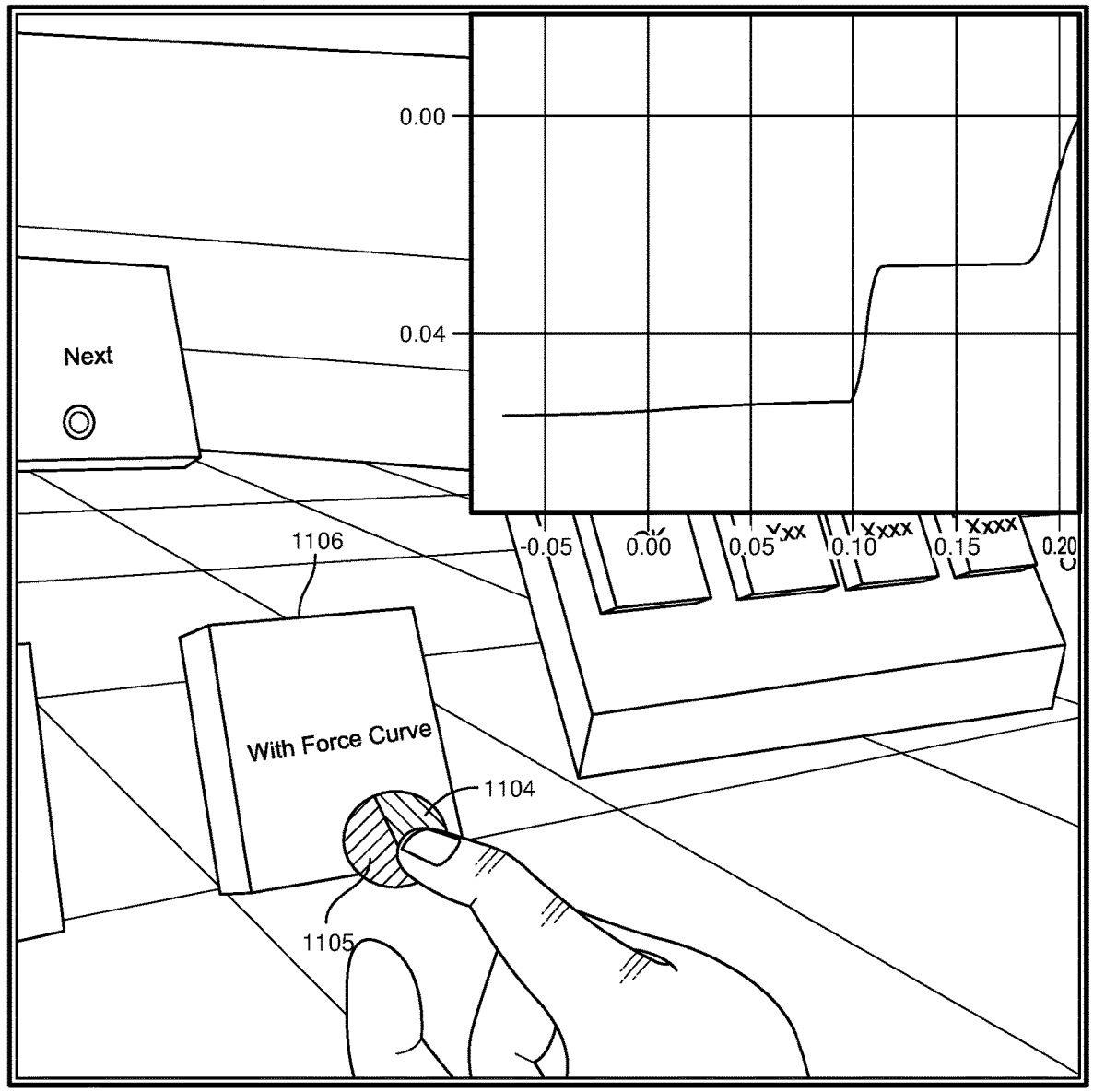
Figure 11D:
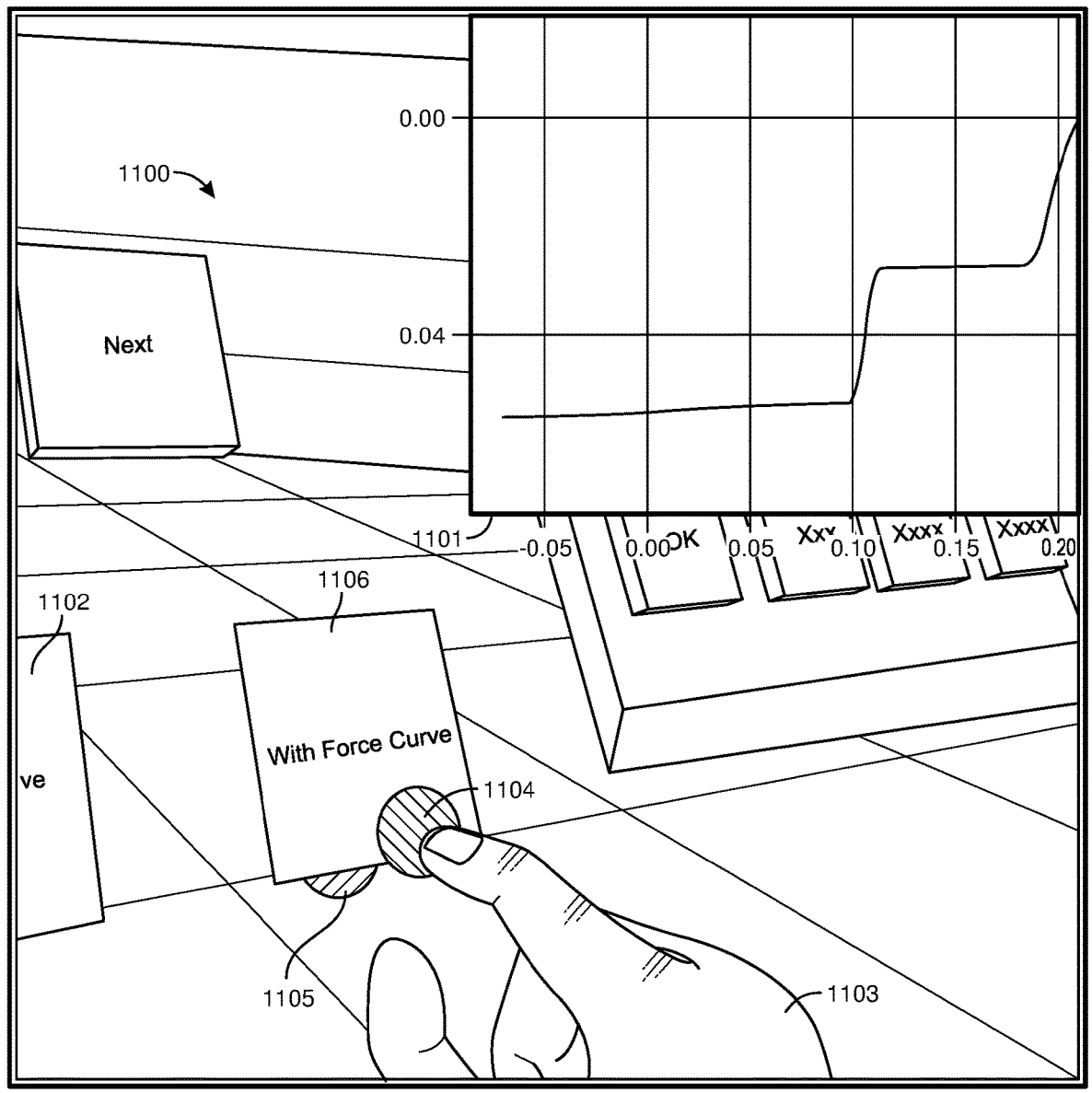

For instance, FIG. 11B illustrates how virtual button 1102 may behave without force profiles enabled. When the user's physical hand (as indicated by indicator 1105) or other physical object touches the virtual button 1102, the button is immediately depressed and selected. In contrast, in FIGS. 11C and 11D, when force profiles are enabled, the virtual button 1106 is partially depressed, as shown in FIG. 11C, and is fully depressed in FIG. 11D. As can be seen in FIG. 11D, the indicator of the user's physical hand 1105 may be substantially below the button 1106, since the user needed to move their physical hand further away from the virtual interface 1100 in order to cause the full selection of the virtual button, according to the force profile 1101.

Still further, some embodiments may provide visual cues (e.g., 1104) on the virtual interface 1100 indicating where the virtual hand 1103 is relative to the virtual interface. At least in some cases, the visual cues 1104 may be provided even if the virtual hand 1103 does not exactly correspond to the user's physical movements. This may occur as the result of controllable decoupling between the physical movements of the user and the virtual representation of those movements (e.g., virtual hand 1103). The visual cue 1104 may be configured to track the position of the virtual hand 1103, even if the physical position of the user's hand would indicate otherwise. The amount of decoupling may be controlled and may be specified in policies. These policies may provide information used by the virtual interface to determine where to place the visual cue 1104. In some cases, instead of just showing an indicator of the user's physical hand (e.g., 1105), the virtual environment may show a representation of the user's physical hand (or other physical object), along with the virtual representation that does not necessarily track the location of the physical object (e.g., in cases of touch limiting, pinning, recoil assist, or when implementing force profiles). Accordingly, in such cases, both the virtual representation of the physical object and the physical object itself may be presented in the virtual environment.

Figure 12A:
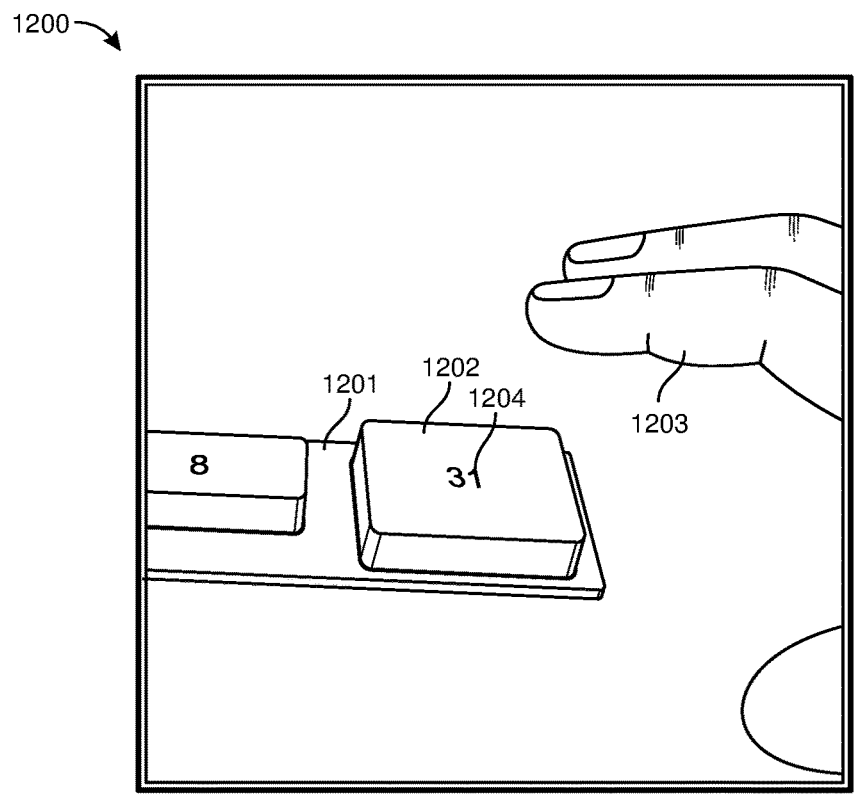
FIGS. 12A-12B illustrate embodiments in which undershot compensation is applied when selecting an item in a virtual interface.
Figure 12B:
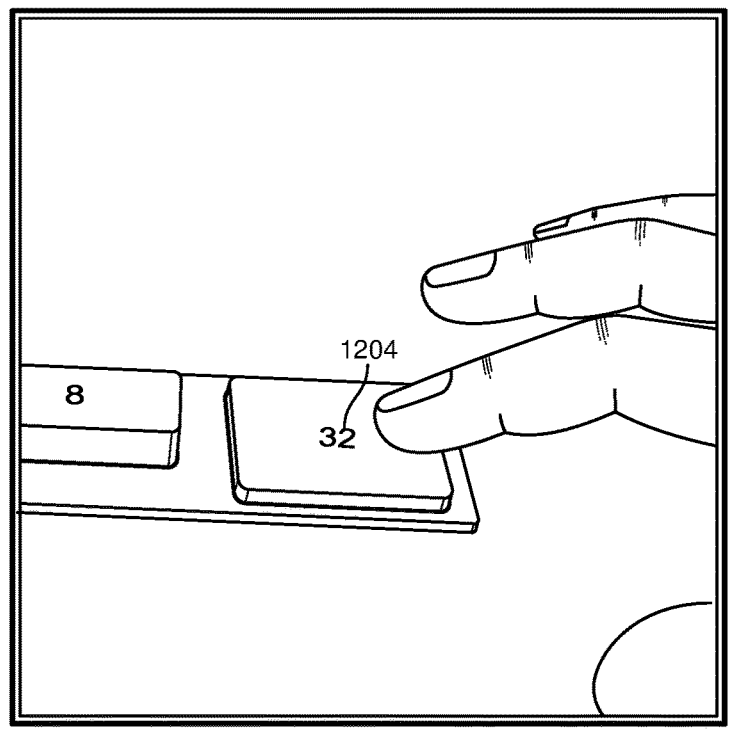

In addition to these scenarios, the embodiments herein may also provide undershot compensation for interactions with virtual items. A shown in FIG. 12A, for example, a virtual interface 1200 may include a row of buttons 1201 including virtual button 1202. The virtual hand 1203 may be shown above the virtual button 1202, which current registers at the value "31" (1204). In some cases, a user's physical movements may come up short of an interaction with a virtual item such as a virtual button. Thus, in such cases, even if the user comes up, for example, 3 cm short of pushing the virtual button 1202, if the position and velocity of the user's physical hand suggest that the virtual button 1202 is to be pushed, the systems herein may interpret the physical input as a button push. Then, as shown in FIG. 12B, the virtual button 1202 may be pressed, resulting in an increased value of "32" at 1204. Thus, various sensors including cameras, accelerometers, etc. may be used to track the position and trajectory of the user's hand(s) or other physical objects. Based on the determined position and/or trajectory, the systems herein may determine that the user intended to interact with a virtual item. The systems may also determine the type of interaction that was intended based on the physical object tracking information. This interaction may then be carried out within the virtual interface.

Any or all of these embodiments may work with a user's hands, with a tool (e.g., a pencil or paintbrush) that the user is holding, or with a controller or other object that is in the user's hand. Thus, for example, a pencil tip may be touch limited or pinned, or a paintbrush or other tool may follow certain force profiles or may implement recoil assist. Still other tools may implement undershot compensation, where various filters may be applied (including, for example, double exponential filters) that are tuned to identify the position and velocity of a tracked physical item and intentionally overshoot or undershoot to interact with a virtual item in an intended manner. Thus, if the user is using a controller and quickly motions the controller at a virtual button, for example, the system will determine that the intent was a button push, and may move the virtual hand in that manner. If, however, the user moved the controller slowly and intentionally toward a virtual button, but did not touch that button, the system may determine that the user did not intend to interact with the button and, in such cases, would depict the virtual hand as being near the virtual button, but not touching it.

Figure 13A:
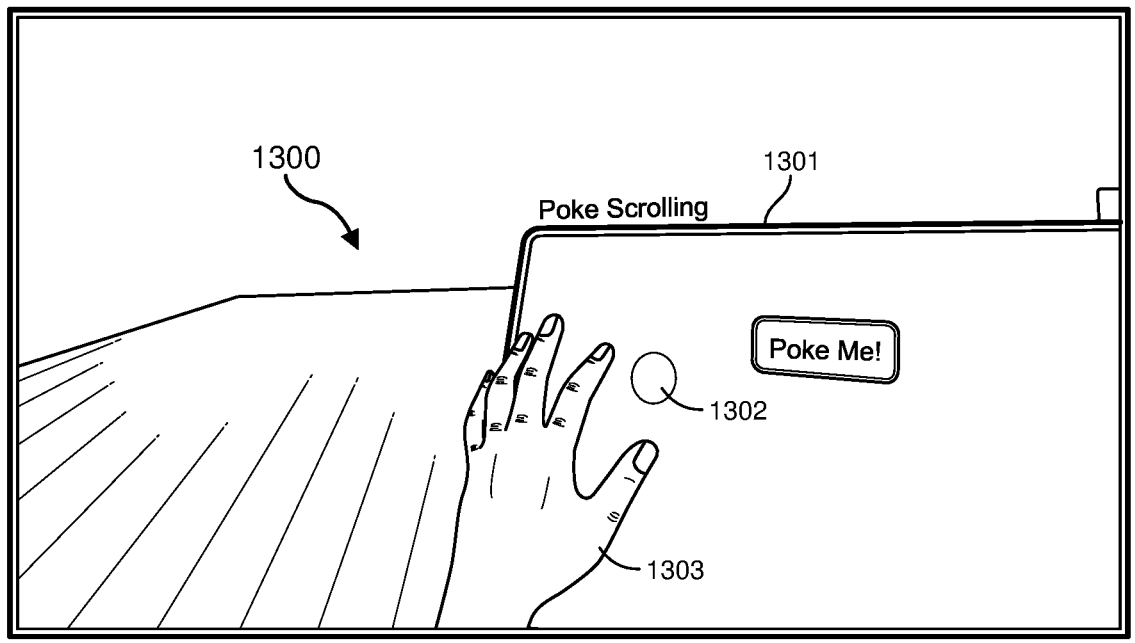
FIGS. 13A-13F illustrate embodiments in which different affordances are illustrated on virtual interfaces in a virtual environment.
Figure 13B:
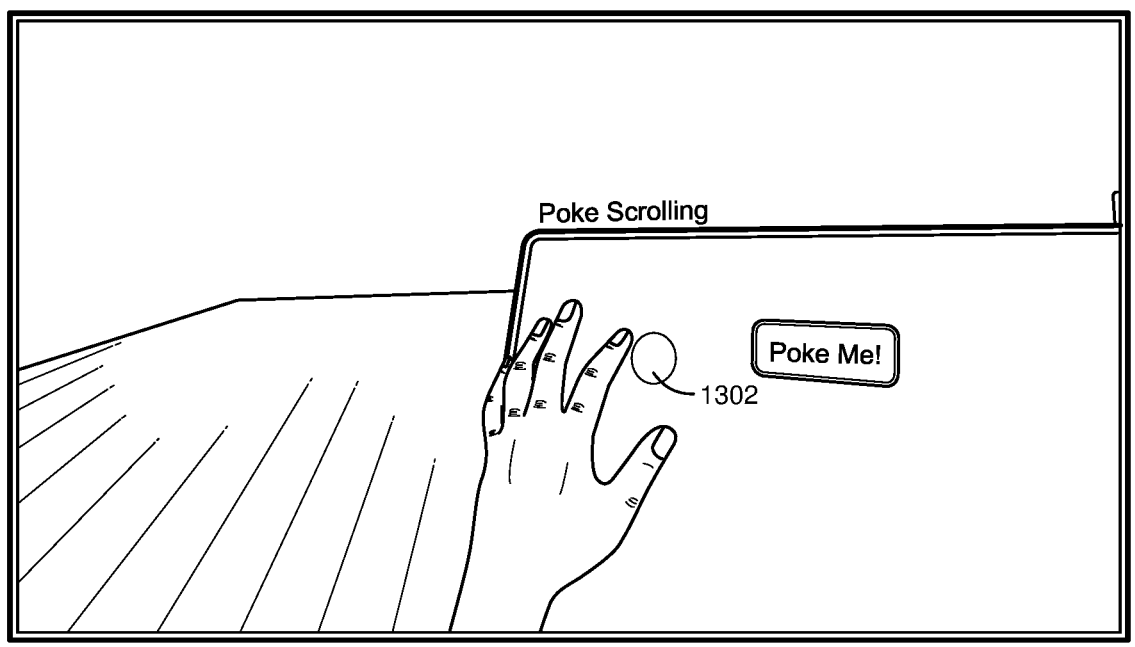
Figure 13C:
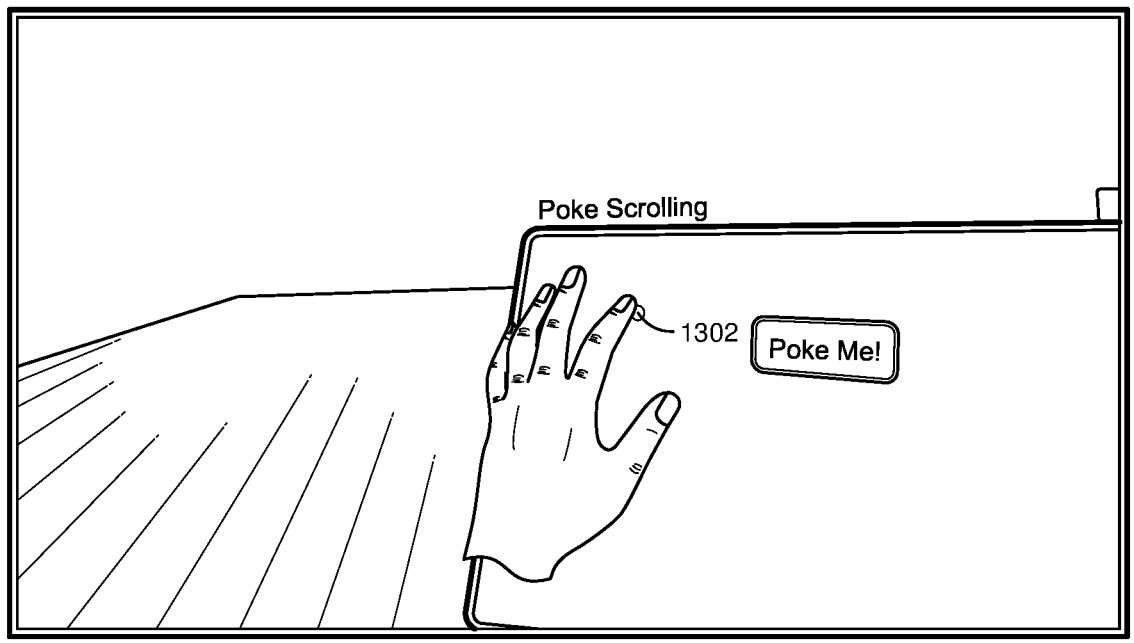

During these interactions, various affordances may be depicted within the virtual environment. For example, as shown in FIGS. 13A-13F, the virtual environment 1300 may include a virtual interface 1301. The virtual interface 1301 may include a virtual representation of a physical object (e.g., virtual hand 1303 representing the user's physical left hand (not shown)). As the user hovers their hand over the virtual interface 1301, the virtual environment 1300 may illustrate an affordance 1302. The affordance 1302 may begin as a defined circle, for example, or may begin as a less defined collection of color. As the user moves their physical hand closer to the virtual interface 1301, the virtual hand 1303 may track the user's movements, and may move the virtual hand 1303 closer to the virtual interface 1301 (as shown in FIG. 13B). Moreover, as the user approaches the surface of the virtual interface, the affordance 1302 may increase in opacity, changing from transparent or partially transparent to partially or fully opaque. At least in some cases, as the user comes in contact with the virtual interface 1301, the affordance 1302 may become smaller and more precise, showing with more precision where the user will touch the virtual interface 1301 if they keep moving toward it, as shown in FIG. 13C. In this manner, the affordance 1302 may align with the part of the user's finger that is closest to the surface of the virtual interface 1301.

Figure 13D:
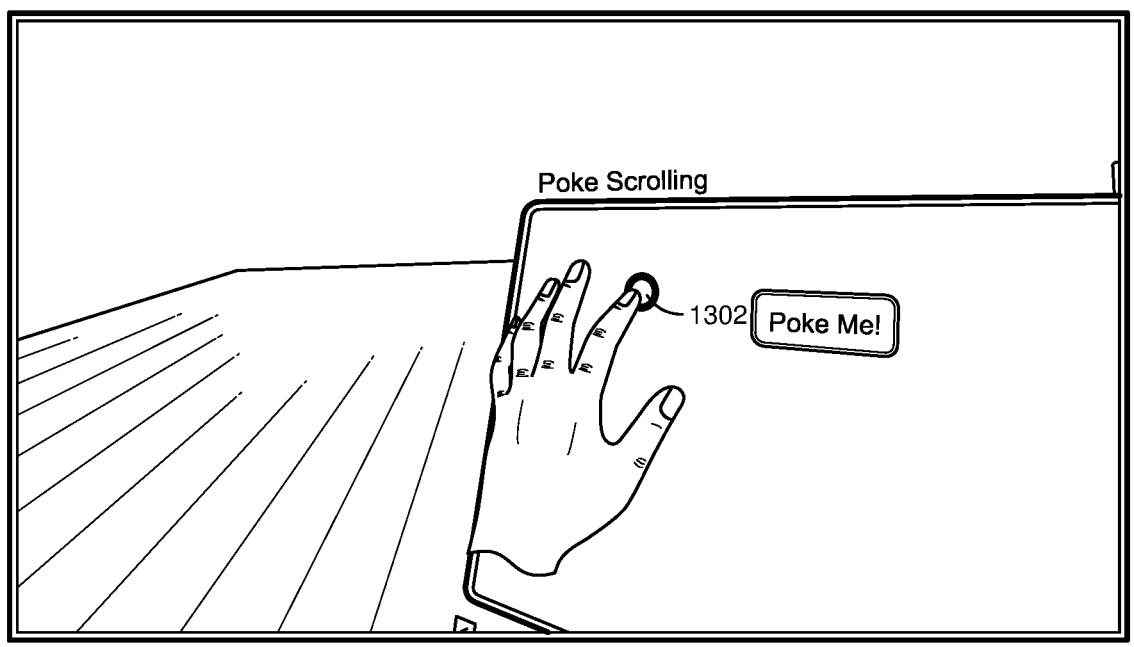
Figure 13E:
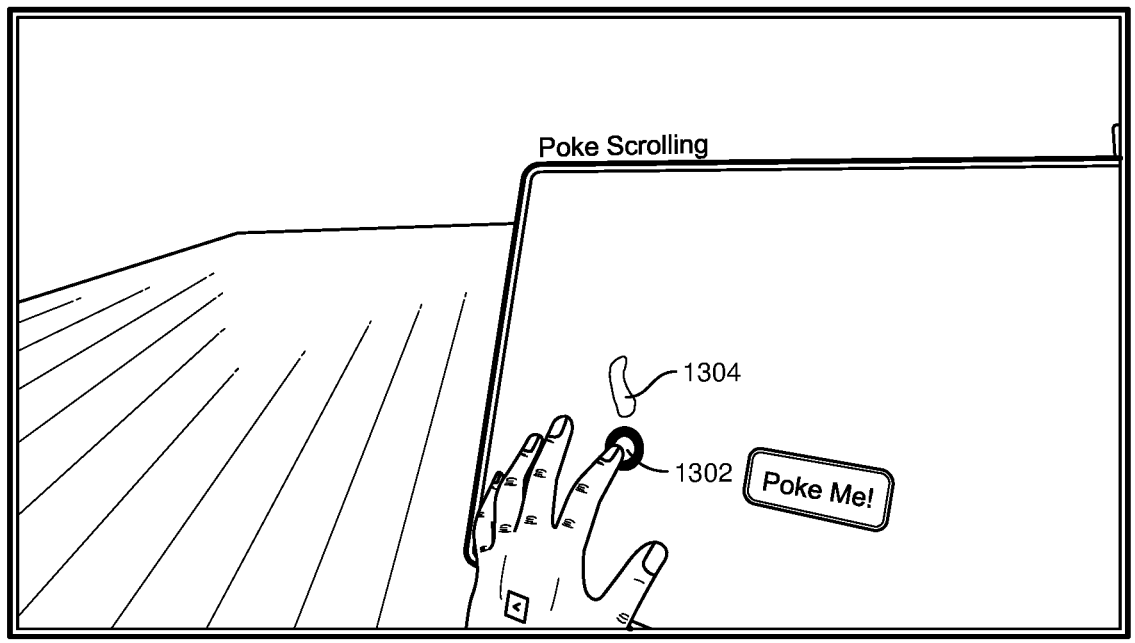

When the user contacts the virtual interface 1301, the affordance 1302 may change to a two-ringed circle, as shown in FIG. 13D. In at least some cases, if the user's finger or hand continue to move past the surface of the virtual interface 1301 (in embodiments where touch limiting is not being used), the two-ringed circle may increase in size and fade out from a precise shape to a more amorphous shape that visualizes the user's finger or hand breaking through the surface of the virtual interface 1301. Of course, it will be understood that the affordance 1302 may be substantially any shape, any size, any color, or any design, and may transition between shapes, sizes, colors, etc. as the user moves toward or away from the virtual interface 1301 (or other virtual object). Moreover, as with the other embodiments described above, the affordance 1302 may be different with different virtual items, in different virtual environments, with different physical objects, etc. Thus, interactions with each virtual item or each virtual environment may be unique.

Figure 13F:
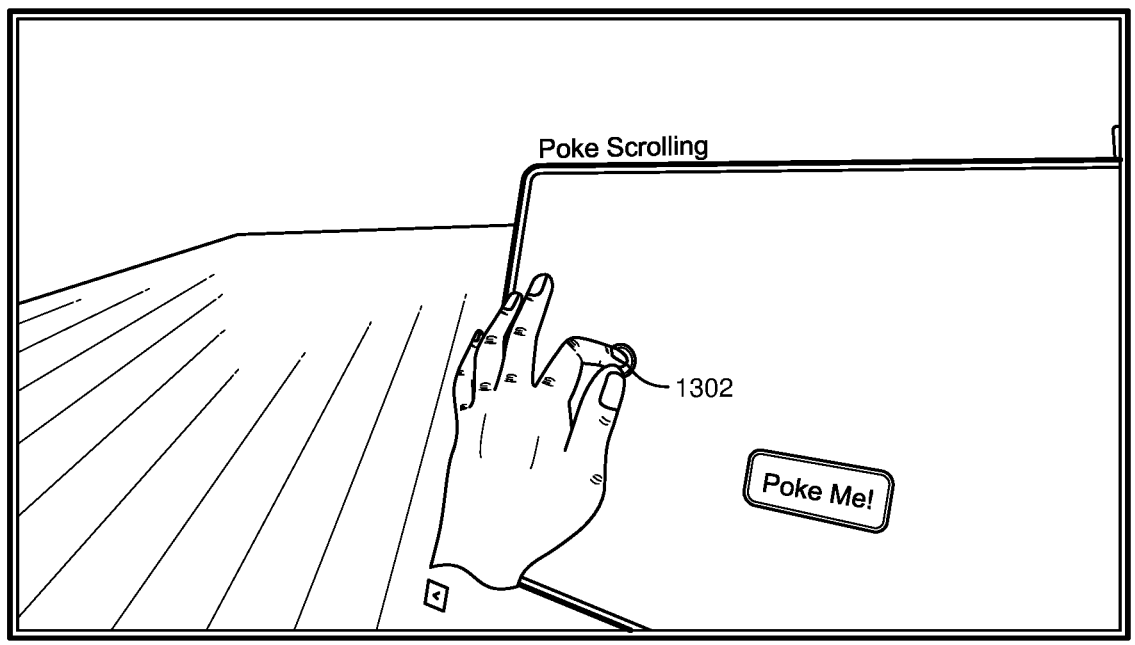

In some cases, after placing the affordance 1302 indicating where the user is touching the virtual interface 1301 (as in FIG. 13D), the virtual environment 1300 may illustrate a trace feature 1304 that indicates where the user has dragged their hand. Thus, between FIGS. 13D and 13E, the user may have dragged their hand (and thus the virtual hand 1303) downward, leaving a trace feature 1304 indicating the path along which the user dragged their finger. Such an additional affordance may assist the user in knowing where the virtual hand 1303 is with respect to the virtual interface 1301. Moreover, the affordance 1302 may indicate how far away from the surface the user's finger is, dynamically changing in size, shape, color, etc. as the user gets closer to or further away from the virtual interface 1301 or other virtual item. In some cases, as shown in FIG. 13F, the affordance 1302 may be configured to remain still, even if the user's hand and/or wrist change positions relative to the virtual interface 1301. Still further, it should be noted that any or all of these embodiments may be configured to work with augmented reality interfaces, virtual reality interfaces, or any other type of computer-generated interfaces or virtual environments.

In addition to the methods described above, systems may be provided that include the following: at least one physical processor and physical memory comprising computer-executable instructions that, when executed by the physical processor, cause the physical processor to: generate a virtual item within a virtual environment, detect, using one or more hardware sensors, a current position of at least one physical object that is to be portrayed within the virtual environment, generate a virtual representation of the physical object within the virtual environment, wherein the virtual representation of the physical object is configured to at least partially follow movements of the physical object relative to the virtual item, and present the virtual item and the generated virtual representation of the physical object within the virtual environment, wherein the virtual representation of the physical object is at least partially, controllably decoupled from the movements of the physical object relative to the virtual item.

Moreover, a non-transitory computer-readable medium may be provided that includes one or more computer-executable instructions that, when executed by at least one processor of a computing device, may cause the computing device to: generate a virtual item within a virtual environment, detect, using one or more hardware sensors, a current position of at least one physical object that is to be portrayed within the virtual environment, generate a virtual representation of the physical object within the virtual environment, wherein the virtual representation of the physical object is configured to at least partially follow movements of the physical object relative to the virtual item, and present the virtual item and the generated virtual representation of the physical object within the virtual environment, wherein the virtual representation of the physical object is at least partially, controllably decoupled from the movements of the physical object relative to the virtual item.

Thus, in this manner, methods, systems, and computer-readable media may be provided which controllably decouple a virtual representation's movements from the movements of a physical object. The controllable decoupling may take the form of touch limiting, pinning, recoil assist, undershot assist, force profiles, or other forms of controlled decoupling. By implementing such embodiments, users may experience less fatigue and less frustration when interacting with virtual items in virtual environments, as their intended actions may be interpreted and carried out, even if their physical movements did not accurately reflect those actions.

EXAMPLE EMBODIMENTS

Example 1: A computer-implemented method may include generating a virtual item within a virtual environment, detecting, using one or more hardware sensors, a current position of at least one physical object that is to be portrayed within the virtual environment, generating a virtual representation of the physical object within the virtual environment, wherein the virtual representation of the physical object is configured to at least partially follow movements of the physical object relative to the virtual item, and presenting the virtual item and the generated virtual representation of the physical object within the virtual environment, wherein the virtual representation of the physical object is at least partially, controllably decoupled from the movements of the physical object relative to the virtual item.

Example 2. The computer-implemented method of Example 1, wherein the virtual item is an interface.

Example 3. The computer-implemented method of any of Examples 1 or 2, wherein the interface comprises a floating user interface within the virtual environment.

Example 4: The computer-implemented method of any of Examples 1-3, wherein the floating user interface is displayed at a fixed position within the virtual environment.

Example 5. The computer-implemented method of any of Examples 1-4, wherein the at least one physical object comprises at least one of: a user's left hand, a user's right hand, a user's fingers, or an electronic controller.

Example 6. The computer-implemented method of any of Examples 1-5, wherein the virtual representation of the physical object is controllably decoupled from the movements of the physical object relative to the virtual item by a specified amount.

Example 7. The computer-implemented method of any of Examples 1-6, wherein the specified amount of decoupling is controlled based on a policy.

Example 8. The computer-implemented method of any of Examples 1-7, wherein the specified amount of decoupling is adaptable over time based on movements of the physical object.

Example 9. The computer-implemented method of any of Examples 1-8, wherein the controllable decoupling of the virtual representation of the physical object from the movements of the physical object relative to the virtual item includes stopping the virtual representation of the physical object at a surface of the virtual item within the virtual environment.

Example 10. The computer-implemented method of any of Examples 1-9, wherein stopping the virtual representation of the physical object at the surface of the virtual item within the virtual environment includes preventing the virtual representation of the physical object from moving beyond the surface of the virtual item.

Example 11. The computer-implemented method of any of Examples 1-10, wherein stopping the virtual representation of the physical object at the surface of the virtual item within the virtual environment includes substantially slowing movement of the virtual representation of the physical object at the surface of the virtual item, and allowing the virtual representation of the physical object to move past the surface of the virtual item upon detecting physical movements indicating such.

Example 12. The computer-implemented method of any of Examples 1-11, further comprising providing haptic feedback using one or more haptic devices upon the virtual representation of the physical object reaching the surface of the virtual item within the virtual environment.

Example 13: A system may include: at least one physical processor and physical memory comprising computer-executable instructions that, when executed by the physical processor, cause the physical processor to: generate a virtual item within a virtual environment, detect, using one or more hardware sensors, a current position of at least one physical object that is to be portrayed within the virtual environment, generate a virtual representation of the physical object within the virtual environment, wherein the virtual representation of the physical object is configured to at least partially follow movements of the physical object relative to the virtual item, and present the virtual item and the generated virtual representation of the physical object within the virtual environment, wherein the virtual representation of the physical object is at least partially, controllably decoupled from the movements of the physical object relative to the virtual item.

Example 14. The system of Example 13, wherein the controllable decoupling of the virtual representation of the physical object from the movements of the physical object relative to the virtual item includes moving the virtual representation of the physical object a lesser percentage of the physical movement of the physical object.

Example 15. The system of any of Examples 13 or 14, wherein the controllable decoupling of the virtual representation of the physical object from the movements of the physical object relative to the virtual item includes pinning the virtual representation of the physical object to a detected current position of the physical object relative to the virtual item.

Example 16. The system of any of Examples 13-15, wherein the virtual representation of the physical object remains pinned to the detected current position of the physical object, even if a portion of the physical object moves away from the detected current position of the physical object.

Example 17. The system of any of Examples 13-16, wherein the controllable decoupling of the virtual representation of the physical object from the movements of the physical object relative to the virtual item includes registering recoil movements from a movement endpoint.

Example 18. The system of any of Examples 13-17, wherein both the virtual representation of the physical object and the physical object are presented in the virtual environment.

Example 19. The system of any of Examples 13-18, wherein the virtual environment presents one or more affordances on the virtual item indicating where the virtual representation of the physical object is positioned to contact the virtual item.

Example 20. A non-transitory computer-readable medium may include one or more computer-executable instructions that, when executed by at least one processor of a computing device, may cause the computing device to: generate a virtual item within a virtual environment, detect, using one or more hardware sensors, a current position of at least one physical object that is to be portrayed within the virtual environment, generate a virtual representation of the physical object within the virtual environment, wherein the virtual representation of the physical object is configured to at least partially follow movements of the physical object relative to the virtual item, and present the virtual item and the generated virtual representation of the physical object within the virtual environment, wherein the virtual representation of the physical object is at least partially, controllably decoupled from the movements of the physical object relative to the virtual item.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1400 in FIG. 14) or that visually immerses a user in an artificial reality (such as, e.g., virtual-reality system 1500 in FIG. 15). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 14:
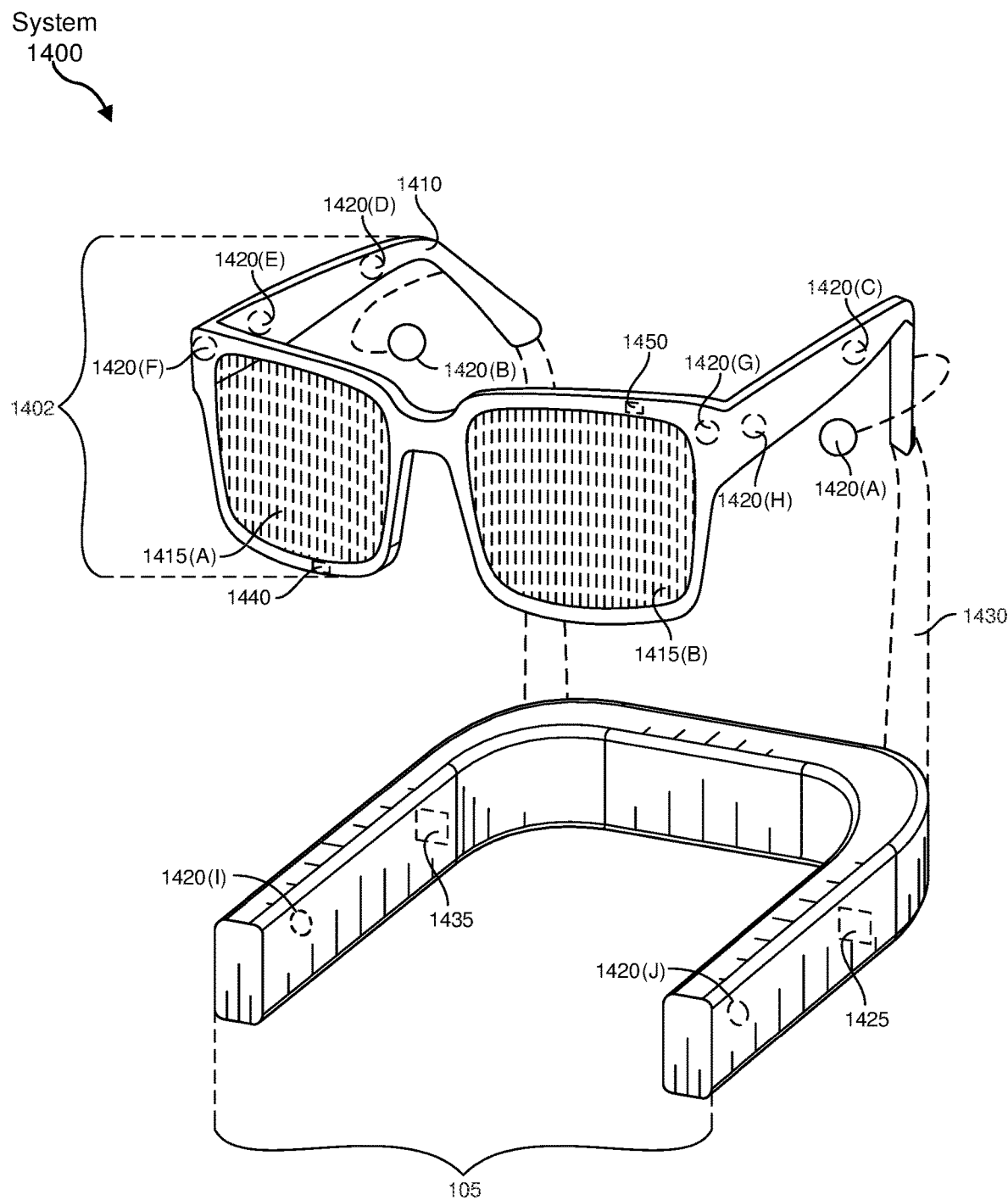
FIG. 14 is an illustration of exemplary augmented-reality glasses that may be used in connection with embodiments of this disclosure.

Turning to FIG. 14, augmented-reality system 1400 may include an eyewear device 1402 with a frame 1410 configured to hold a left display device 1415(A) and a right display device 1415(B) in front of a user's eyes. Display devices 1415(A) and 1415(B) may act together or independently to present an image or series of images to a user. While augmented-reality system 1400 includes two displays, embodiments of this disclosure may be implemented in augmented-reality systems with a single NED or more than two NEDs.

In some embodiments, augmented-reality system 1400 may include one or more sensors, such as sensor 1440. Sensor 1440 may generate measurement signals in response to motion of augmented-reality system 1400 and may be located on substantially any portion of frame 1410. Sensor 1440 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1400 may or may not include sensor 1440 or may include more than one sensor. In embodiments in which sensor 1440 includes an IMU, the IMU may generate calibration data based on measurement signals from sensor 1440. Examples of sensor 1440 may include, without limitation, accelerometers, gyroscopes, magnetometers, other suitable types of sensors that detect motion, sensors used for error correction of the IMU, or some combination thereof.

In some examples, augmented-reality system 1400 may also include a microphone array with a plurality of acoustic transducers 1420(A)-1420(J), referred to collectively as acoustic transducers 1420. Acoustic transducers 1420 may represent transducers that detect air pressure variations induced by sound waves. Each acoustic transducer 1420 may be configured to detect sound and convert the detected sound into an electronic format (e.g., an analog or digital format). The microphone array in FIG. 14 may include, for example, ten acoustic transducers: 1420(A) and 1420(B), which may be designed to be placed inside a corresponding ear of the user, acoustic transducers 1420(C), 1420(D), 1420(E), 1420(F), 1420(G), and 1420(H), which may be positioned at various locations on frame 1410, and/or acoustic transducers 1420(I) and 1420(J), which may be positioned on a corresponding neckband 1405.

In some embodiments, one or more of acoustic transducers 1420(A)-(J) may be used as output transducers (e.g., speakers). For example, acoustic transducers 1420(A) and/or 1420(B) may be earbuds or any other suitable type of headphone or speaker.

The configuration of acoustic transducers 1420 of the microphone array may vary. While augmented-reality system 1400 is shown in FIG. 14 as having ten acoustic transducers 1420, the number of acoustic transducers 1420 may be greater or less than ten. In some embodiments, using higher numbers of acoustic transducers 1420 may increase the amount of audio information collected and/or the sensitivity and accuracy of the audio information. In contrast, using a lower number of acoustic transducers 1420 may decrease the computing power required by an associated controller 1450 to process the collected audio information. In addition, the position of each acoustic transducer 1420 of the microphone array may vary. For example, the position of an acoustic transducer 1420 may include a defined position on the user, a defined coordinate on frame 1410, an orientation associated with each acoustic transducer 1420, or some combination thereof.

Acoustic transducers 1420(A) and 1420(B) may be positioned on different parts of the user's ear, such as behind the pinna, behind the tragus, and/or within the auricle or fossa. Or, there may be additional acoustic transducers 1420 on or surrounding the ear in addition to acoustic transducers 1420 inside the ear canal. Having an acoustic transducer 1420 positioned next to an ear canal of a user may enable the microphone array to collect information on how sounds arrive at the ear canal. By positioning at least two of acoustic transducers 1420 on either side of a user's head (e.g., as binaural microphones), augmented-reality device 1400 may simulate binaural hearing and capture a 3D stereo sound field around about a user's head. In some embodiments, acoustic transducers 1420(A) and 1420(B) may be connected to augmented-reality system 1400 via a wired connection 1430, and in other embodiments acoustic transducers 1420(A) and 1420(B) may be connected to augmented-reality system 1400 via a wireless connection (e.g., a BLUETOOTH connection). In still other embodiments, acoustic transducers 1420(A) and 1420(B) may not be used at all in conjunction with augmented-reality system 1400.

Acoustic transducers 1420 on frame 1410 may be positioned in a variety of different ways, including along the length of the temples, across the bridge, above or below display devices 1415(A) and 1415(B), or some combination thereof. Acoustic transducers 1420 may also be oriented such that the microphone array is able to detect sounds in a wide range of directions surrounding the user wearing the augmented-reality system 1400. In some embodiments, an optimization process may be performed during manufacturing of augmented-reality system 1400 to determine relative positioning of each acoustic transducer 1420 in the microphone array.

In some examples, augmented-reality system 1400 may include or be connected to an external device (e.g., a paired device), such as neckband 1405. Neckband 1405 generally represents any type or form of paired device. Thus, the following discussion of neckband 1405 may also apply to various other paired devices, such as charging cases, smart watches, smart phones, wrist bands, other wearable devices, hand-held controllers, tablet computers, laptop computers, other external compute devices, etc.

As shown, neckband 1405 may be coupled to eyewear device 1402 via one or more connectors. The connectors may be wired or wireless and may include electrical and/or non-electrical (e.g., structural) components. In some cases, eyewear device 1402 and neckband 1405 may operate independently without any wired or wireless connection between them. While FIG. 14 illustrates the components of eyewear device 1402 and neckband 1405 in example locations on eyewear device 1402 and neckband 1405, the components may be located elsewhere and/or distributed differently on eyewear device 1402 and/or neckband 1405. In some embodiments, the components of eyewear device 1402 and neckband 1405 may be located on one or more additional peripheral devices paired with eyewear device 1402, neckband 1405, or some combination thereof.

Pairing external devices, such as neckband 1405, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1400 may be provided by a paired device or shared between a paired device and an eyewear device, thus reducing the weight, heat profile, and form factor of the eyewear device overall while still retaining desired functionality. For example, neckband 1405 may allow components that would otherwise be included on an eyewear device to be included in neckband 1405 since users may tolerate a heavier weight load on their shoulders than they would tolerate on their heads. Neckband 1405 may also have a larger surface area over which to diffuse and disperse heat to the ambient environment. Thus, neckband 1405 may allow for greater battery and computation capacity than might otherwise have been possible on a stand-alone eyewear device. Since weight carried in neckband 1405 may be less invasive to a user than weight carried in eyewear device 1402, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1405 may be communicatively coupled with eyewear device 1402 and/or to other devices. These other devices may provide certain functions (e.g., tracking, localizing, depth mapping, processing, storage, etc.) to augmented-reality system 1400. In the embodiment of FIG. 14, neckband 1405 may include two acoustic transducers (e.g., 1420(1) and 1420(J)) that are part of the microphone array (or potentially form their own microphone subarray). Neckband 1405 may also include a controller 1425 and a power source 1435.

Acoustic transducers 1420(1) and 1420(J) of neckband 1405 may be configured to detect sound and convert the detected sound into an electronic format (analog or digital). In the embodiment of FIG. 14, acoustic transducers 1420(1) and 1420(J) may be positioned on neckband 1405, thereby increasing the distance between the neckband acoustic transducers 1420(1) and 1420(J) and other acoustic transducers 1420 positioned on eyewear device 1402. In some cases, increasing the distance between acoustic transducers 1420 of the microphone array may improve the accuracy of beamforming performed via the microphone array. For example, if a sound is detected by acoustic transducers 1420(C) and 1420(D) and the distance between acoustic transducers 1420(C) and 1420(D) is greater than, e.g., the distance between acoustic transducers 1420(D) and 1420(E), the determined source location of the detected sound may be more accurate than if the sound had been detected by acoustic transducers 1420(D) and 1420(E).

Controller 1425 of neckband 1405 may process information generated by the sensors on neckband 1405 and/or augmented-reality system 1400. For example, controller 1425 may process information from the microphone array that describes sounds detected by the microphone array. For each detected sound, controller 1425 may perform a direction-of-arrival (DOA) estimation to estimate a direction from which the detected sound arrived at the microphone array. As the microphone array detects sounds, controller 1425 may populate an audio data set with the information. In embodiments in which augmented-reality system 1400 includes an inertial measurement unit, controller 1425 may compute all inertial and spatial calculations from the IMU located on eyewear device 1402. A connector may convey information between augmented-reality system 1400 and neckband 1405 and between augmented-reality system 1400 and controller 1425. The information may be in the form of optical data, electrical data, wireless data, or any other transmittable data form. Moving the processing of information generated by augmented-reality system 1400 to neckband 1405 may reduce weight and heat in eyewear device 1402, making it more comfortable to the user.

Power source 1435 in neckband 1405 may provide power to eyewear device 1402 and/or to neckband 1405. Power source 1435 may include, without limitation, lithium ion batteries, lithium-polymer batteries, primary lithium batteries, alkaline batteries, or any other form of power storage. In some cases, power source 1435 may be a wired power source. Including power source 1435 on neckband 1405 instead of on eyewear device 1402 may help better distribute the weight and heat generated by power source 1435.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1500 in FIG. 15, that mostly or completely covers a user's field of view. Virtual-reality system 1500 may include a front rigid body 1502 and a band 1504 shaped to fit around a user's head. Virtual-reality system 1500 may also include output audio transducers 1506(A) and 1506(B). Furthermore, while not shown in FIG. 15, front rigid body 1502 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 1400 and/or virtual-reality system 1500 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 1400 and/or virtual-reality system 1500 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1400 and/or virtual-reality system 1500 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, artificial-reality systems 1400 and 1500 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 16:
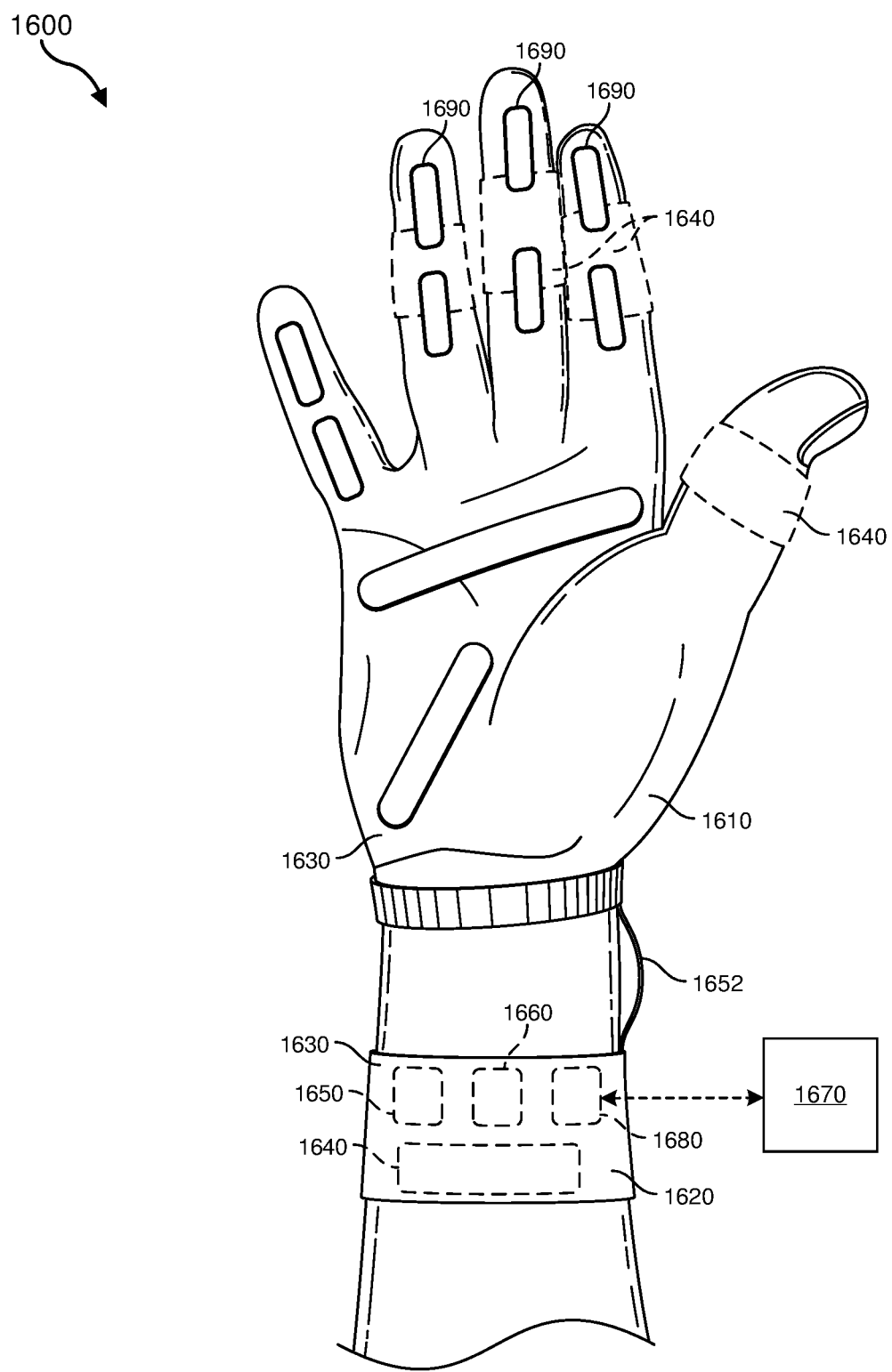
FIG. 16 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 16 illustrates a vibrotactile system 1600 in the form of a wearable glove (haptic device 1610) and wristband (haptic device 1620). Haptic device 1610 and haptic device 1620 are shown as examples of wearable devices that include a flexible, wearable textile material 1630 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, nonwoven fabric, leather, cloth, a flexible polymer material, composite materials, etc.

One or more vibrotactile devices 1640 may be positioned at least partially within one or more corresponding pockets formed in textile material 1630 of vibrotactile system 1600. Vibrotactile devices 1640 may be positioned in locations to provide a vibrating sensation (e.g., haptic feedback) to a user of vibrotactile system 1600. For example, vibrotactile devices 1640 may be positioned against the user's finger(s), thumb, or wrist, as shown in FIG. 16. Vibrotactile devices 1640 may, in some examples, be sufficiently flexible to conform to or bend with the user's corresponding body part(s).

A power source 1650 (e.g., a battery) for applying a voltage to the vibrotactile devices 1640 for activation thereof may be electrically coupled to vibrotactile devices 1640, such as via conductive wiring 1652. In some examples, each of vibrotactile devices 1640 may be independently electrically coupled to power source 1650 for individual activation. In some embodiments, a processor 1660 may be operatively coupled to power source 1650 and configured (e.g., programmed) to control activation of vibrotactile devices 1640.

Vibrotactile system 1600 may be implemented in a variety of ways. In some examples, vibrotactile system 1600 may be a standalone system with integral subsystems and components for operation independent of other devices and systems. As another example, vibrotactile system 1600 may be configured for interaction with another device or system 1670. For example, vibrotactile system 1600 may, in some examples, include a communications interface 1680 for receiving and/or sending signals to the other device or system 1670. The other device or system 1670 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1680 may enable communications between vibrotactile system 1600 and the other device or system 1670 via a wireless (e.g., Wi-Fi, BLUETOOTH, cellular, radio, etc.) link or a wired link. If present, communications interface 1680 may be in communication with processor 1660, such as to provide a signal to processor 1660 to activate or deactivate one or more of the vibrotactile devices 1640.

Vibrotactile system 1600 may optionally include other subsystems and components, such as touch-sensitive pads 1690, pressure sensors, motion sensors, position sensors, lighting elements, and/or user interface elements (e.g., an on/off button, a vibration control element, etc.). During use, vibrotactile devices 1640 may be configured to be activated for a variety of different reasons, such as in response to the user's interaction with user interface elements, a signal from the motion or position sensors, a signal from the touch-sensitive pads 1690, a signal from the pressure sensors, a signal from the other device or system 1670, etc.

Although power source 1650, processor 1660, and communications interface 1680 are illustrated in FIG. 16 as being positioned in haptic device 1620, the present disclosure is not so limited. For example, one or more of power source 1650, processor 1660, or communications interface 1680 may be positioned within haptic device 1610 or within another wearable textile.

Figure 17:
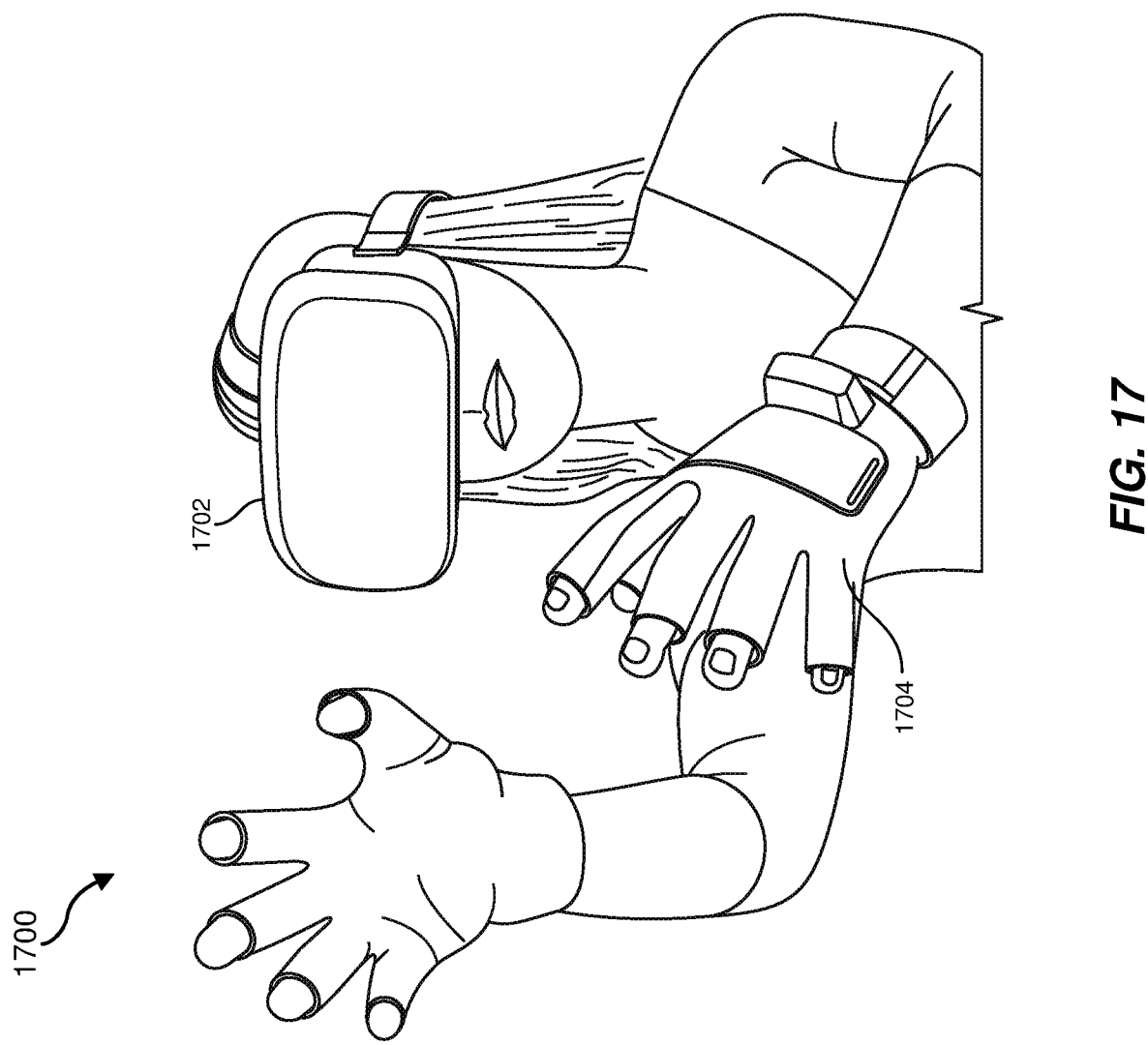
FIG. 17 is an illustration of an exemplary virtual-reality environment according to embodiments of this disclosure.

Haptic wearables, such as those shown in and described in connection with FIG. 16, may be implemented in a variety of types of artificial-reality systems and environments. FIG. 17 shows an example artificial-reality environment 1700 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 15:
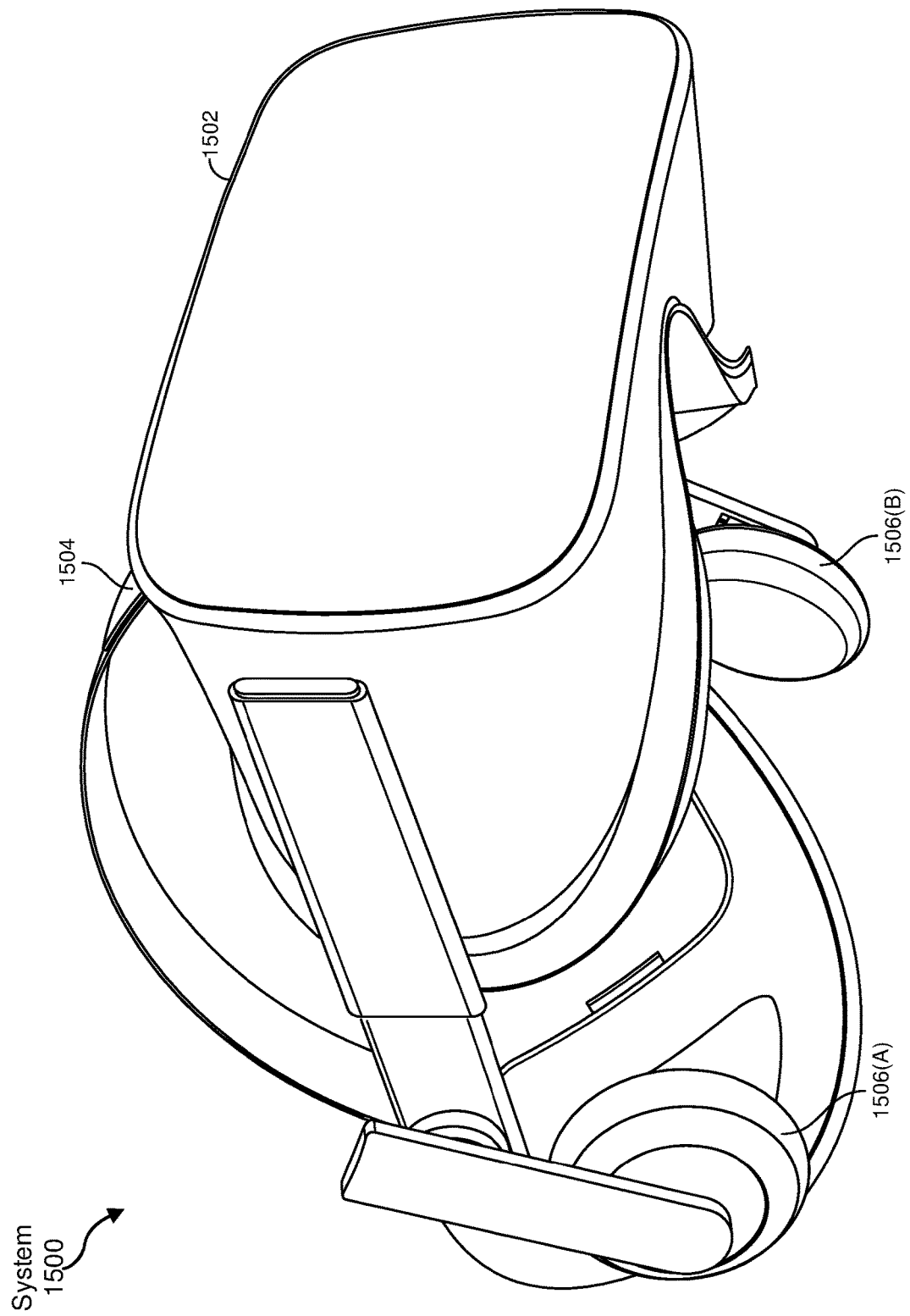
FIG. 15 is an illustration of an exemplary virtual-reality headset that may be used in connection with embodiments of this disclosure.

Head-mounted display 1702 generally represents any type or form of virtual-reality system, such as virtual-reality system 1500 in FIG. 15. Haptic device 1704 generally represents any type or form of wearable device, worn by a user of an artificial-reality system, that provides haptic feedback to the user to give the user the perception that he or she is physically engaging with a virtual object. In some embodiments, haptic device 1704 may provide haptic feedback by applying vibration, motion, and/or force to the user. For example, haptic device 1704 may limit or augment a user's movement. To give a specific example, haptic device 1704 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 1704 to send action requests to a console. Examples of action requests include, without limitation, requests to start an application and/or end the application and/or requests to perform a particular action within the application.

Figure 18:
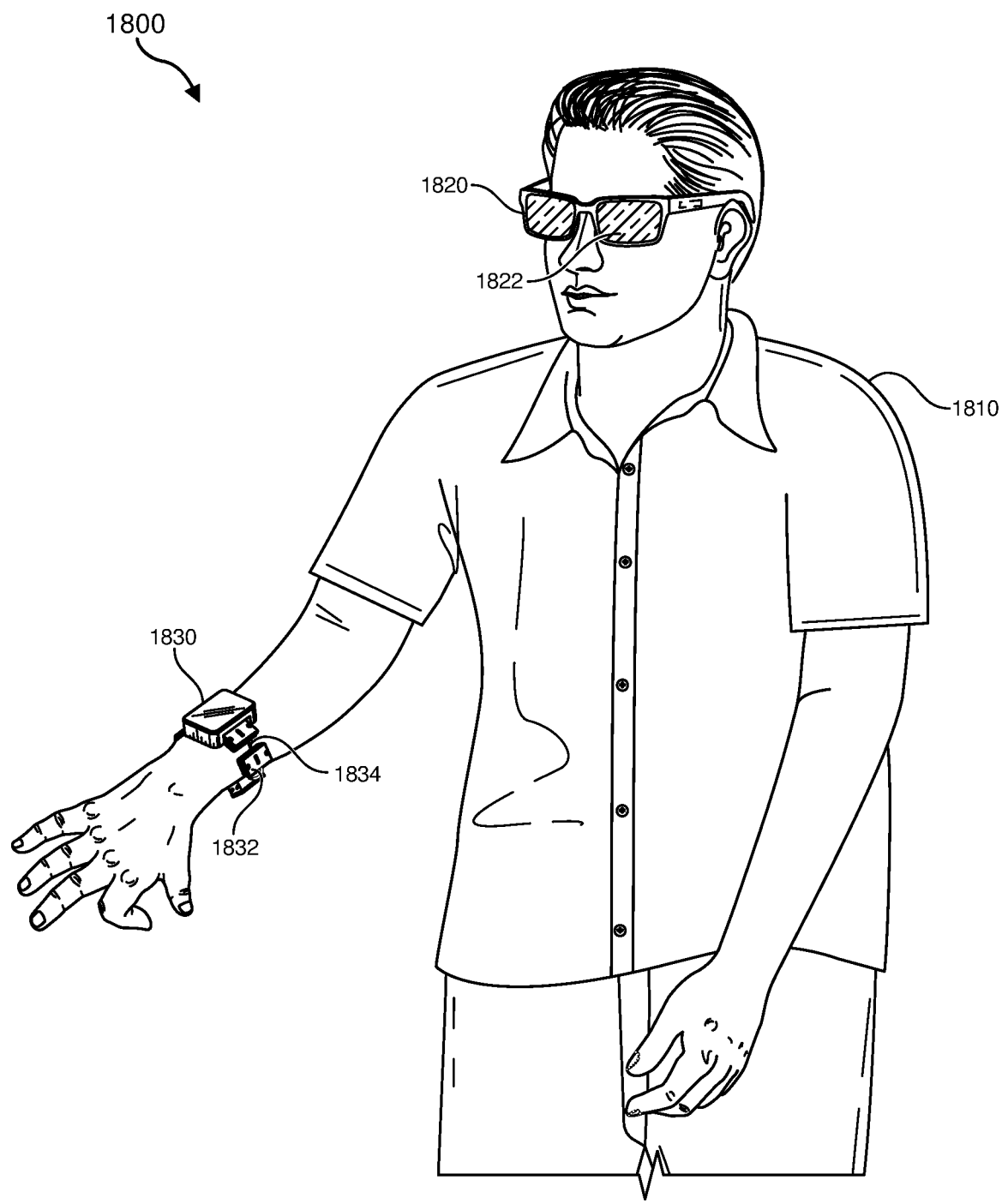
FIG. 18 is an illustration of an exemplary augmented-reality environment according to embodiments of this disclosure.

While haptic interfaces may be used with virtual-reality systems, as shown in FIG. 17, haptic interfaces may also be used with augmented-reality systems, as shown in FIG. 18. FIG. 18 is a perspective view of a user 1810 interacting with an augmented-reality system 1800. In this example, user 1810 may wear a pair of augmented-reality glasses 1820 that may have one or more displays 1822 and that are paired with a haptic device 1830. In this example, haptic device 1830 may be a wristband that includes a plurality of band elements 1832 and a tensioning mechanism 1834 that connects band elements 1832 to one another.

One or more of band elements 1832 may include any type or form of actuator suitable for providing haptic feedback. For example, one or more of band elements 1832 may be configured to provide one or more of various types of cutaneous feedback, including vibration, force, traction, texture, and/or temperature. To provide such feedback, band elements 1832 may include one or more of various types of actuators. In one example, each of band elements 1832 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1610, 1620, 1704, and 1830 may include any suitable number and/or type of haptic transducer, sensor, and/or feedback mechanism. For example, haptic devices 1610, 1620, 1704, and 1830 may include one or more mechanical transducers, piezoelectric transducers, and/or fluidic transducers. Haptic devices 1610, 1620, 1704, and 1830 may also include various combinations of different types and forms of transducers that work together or independently to enhance a user's artificial-reality experience. In one example, each of band elements 1832 of haptic device 1830 may include a vibrotactor (e.g., a vibrotactile actuator) configured to vibrate in unison or independently to provide one or more of various types of haptic sensations to a user.

Figure 19A:
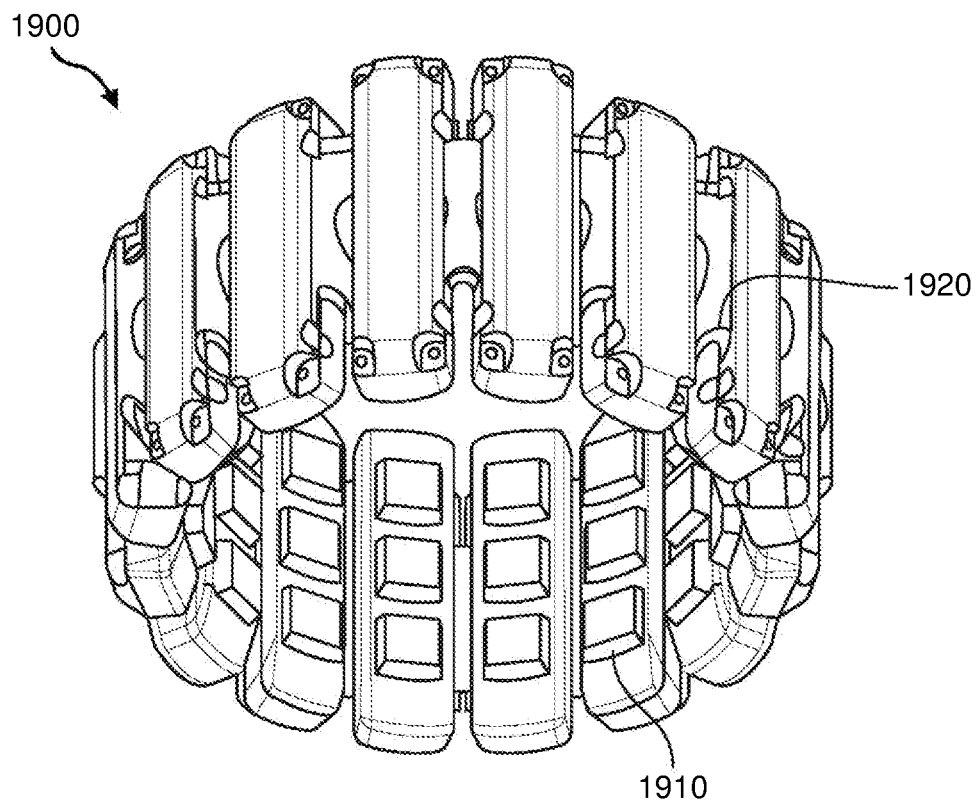
FIGS. 19A and 19B are illustrations of an exemplary human-machine interface configured to be worn around a user's lower arm or wrist.
Figure 19B:
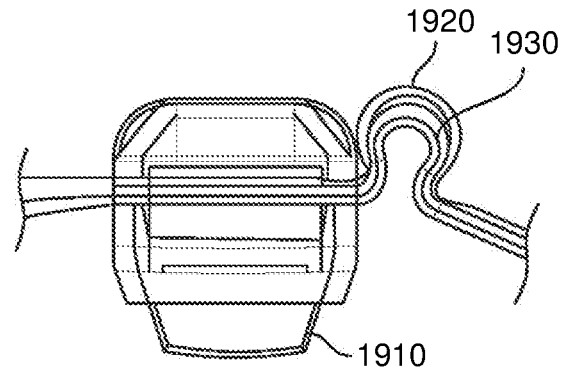

FIG. 19A illustrates an exemplary human-machine interface (also referred to herein as an EMG control interface) configured to be worn around a user's lower arm or wrist as a wearable system 1900. In this example, wearable system 1900 may include sixteen neuromuscular sensors 1910 (e.g., EMG sensors) arranged circumferentially around an elastic band 1920 with an interior surface 1930 configured to contact a user's skin. However, any suitable number of neuromuscular sensors may be used. The number and arrangement of neuromuscular sensors may depend on the particular application for which the wearable device is used. For example, a wearable armband or wristband can be used to generate control information for controlling an augmented reality system, a robot, controlling a vehicle, scrolling through text, controlling a virtual avatar, or any other suitable control task. As shown, the sensors may be coupled together using flexible electronics incorporated into the wireless device. FIG. 19B illustrates a cross-sectional view through one of the sensors of the wearable device shown in FIG. 19A. In some embodiments, the output of one or more of the sensing components can be optionally processed using hardware signal processing circuitry (e.g., to perform amplification, filtering, and/or rectification). In other embodiments, at least some signal processing of the output of the sensing components can be performed in software. Thus, signal processing of signals sampled by the sensors can be performed in hardware, software, or by any suitable combination of hardware and software, as aspects of the technology described herein are not limited in this respect. A non-limiting example of a signal processing chain used to process recorded data from sensors 1910 is discussed in more detail below with reference to FIGS. 20A and 20B.

FIGS. 20A and 20B illustrate an exemplary schematic diagram with internal components of a wearable system with EMG sensors. As shown, the wearable system may include a wearable portion 2010 (FIG. 20A) and a dongle portion 2020 (FIG. 20B) in communication with the wearable portion 2010 (e.g., via BLUETOOTH or another suitable wireless communication technology). As shown in FIG. 20A, the wearable portion 2010 may include skin contact electrodes 2011, examples of which are described in connection with FIGS. 19A and 19B. The output of the skin contact electrodes 2011 may be provided to analog front end 2030, which may be configured to perform analog processing (e.g., amplification, noise reduction, filtering, etc.) on the recorded signals. The processed analog signals may then be provided to analog-to-digital converter 2032, which may convert the analog signals to digital signals that can be processed by one or more computer processors. An example of a computer processor that may be used in accordance with some embodiments is microcontroller (MCU) 2034, illustrated in FIG. 20A. As shown, MCU 2034 may also include inputs from other sensors (e.g., IMU sensor 2040), and power and battery module 2042. The output of the processing performed by MCU 2034 may be provided to antenna 2050 for transmission to dongle portion 2020 shown in FIG. 20B.

Dongle portion 2020 may include antenna 2052, which may be configured to communicate with antenna 2050 included as part of wearable portion 2010. Communication between antennas 2050 and 2052 may occur using any suitable wireless technology and protocol, non-limiting examples of which include radiofrequency signaling and BLUETOOTH. As shown, the signals received by antenna 2052 of dongle portion 2020 may be provided to a host computer for further processing, display, and/or for effecting control of a particular physical or virtual object or objects.

Although the examples provided with reference to FIGS. 19A-19B and FIGS. 20A-20B are discussed in the context of interfaces with EMG sensors, the techniques described herein for reducing electromagnetic interference can also be implemented in wearable interfaces with other types of sensors including, but not limited to, mechanomyography (MMG) sensors, sonomyography (SMG) sensors, and electrical impedance tomography (EIT) sensors. The techniques described herein for reducing electromagnetic interference can also be implemented in wearable interfaces that communicate with computer hosts through wires and cables (e.g., USB cables, optical fiber cables, etc.).

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, and output a result of the transformation to control interactions with virtual objects. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   generating a virtual item within a virtual environment;
   detecting, using one or more hardware sensors, a current position of at least one physical object associated with a user, wherein the physical object is to be portrayed within the virtual environment;
   generating a virtual representation of the physical object within the virtual environment, wherein the virtual representation of the physical object is configured to at least partially follow movements of the physical object relative to the virtual item;
   determining the intent of the user's movements of the physical object relative to the virtual item; and
   presenting the virtual item and the generated virtual representation of the physical object within the virtual environment, wherein the virtual representation of the physical object is controllably decoupled by a specified amount from the movements of the physical object relative to the virtual item, wherein the specified amount of controlled decoupling is determined based on the determined intent of the user's movements.

2. The computer-implemented method of claim 1, wherein the virtual item comprises an interface.

3. The computer-implemented method of claim 2, wherein the interface comprises a floating user interface within the virtual environment.

4. The computer-implemented method of claim 3, wherein the floating user interface is displayed at a fixed position within the virtual environment.

5. The computer-implemented method of claim 1, wherein the at least one physical object comprises at least one of:
   a user's left hand;
   a user's right hand;
   a user's fingers; or
   an electronic controller.

6. The computer-implemented method of claim 1, wherein the virtual representation of the physical object is controllably decoupled from the movements of the physical object relative to the virtual item by a specified amount.

7. The computer-implemented method of claim 6, wherein the specified amount of decoupling is controlled based on a policy.

8. The computer-implemented method of claim 6, wherein the specified amount of decoupling is adaptable over time based on movements of the physical object.

9. The computer-implemented method of claim 1, wherein the controllable decoupling of the virtual representation of the physical object from the movements of the physical object relative to the virtual item includes stopping the virtual representation of the physical object at a surface of the virtual item within the virtual environment.

10. The computer-implemented method of claim 9, wherein stopping the virtual representation of the physical object at the surface of the virtual item within the virtual environment includes preventing the virtual representation of the physical object from moving beyond the surface of the virtual item.

11. The computer-implemented method of claim 9, wherein stopping the virtual representation of the physical object at the surface of the virtual item within the virtual environment includes substantially slowing movement of the virtual representation of the physical object at the surface of the virtual item, and allowing the virtual representation of the physical object to move past the surface of the virtual item upon detecting physical movements indicating such.

12. The computer-implemented method of claim 10, further comprising providing haptic feedback using one or more haptic devices upon the virtual representation of the physical object reaching the surface of the virtual item within the virtual environment.

13. A system comprising:
    at least one physical processor; and
    physical memory comprising computer-executable instructions that, when executed by the physical processor, cause the physical processor to:
    generate a virtual item within a virtual environment;
    detect, using one or more hardware sensors, a current position of at least one physical object associated with a user, wherein the physical object is to be portrayed within the virtual environment;
    generate a virtual representation of the physical object within the virtual environment, wherein the virtual representation of the physical object is configured to at least partially follow movements of the physical object relative to the virtual item;
    determine the intent of the user's movements of the physical object relative to the virtual item; and
    present the virtual item and the generated virtual representation of the physical object within the virtual environment, wherein the virtual representation of the physical object is controllably decoupled by a specified amount from the movements of the physical object relative to the virtual item, wherein the specified amount of controlled decoupling is determined based on the determined intent of the user's movements.

14. The system of claim 13, wherein the controllable decoupling of the virtual representation of the physical object from the movements of the physical object relative to the virtual item includes moving the virtual representation of the physical object a lesser percentage of the movement of the physical object.

15. The system of claim 13, wherein the controllable decoupling of the virtual representation of the physical object from the movements of the physical object relative to the virtual item includes pinning the virtual representation of the physical object to a detected current position of the physical object relative to the virtual item.

16. The system of claim 15, wherein the virtual representation of the physical object remains pinned to the detected current position of the physical object, even if a portion of the physical object moves away from the detected current position of the physical object.

17. The system of claim 13, wherein the controllable decoupling of the virtual representation of the physical object from the movements of the physical object relative to the virtual item includes registering recoil movements from a movement endpoint.

18. The system of claim 13, wherein both the virtual representation of the physical object and the physical object are presented in the virtual environment.

19. The system of claim 13, wherein the virtual environment presents one or more affordances on the virtual item indicating where the virtual representation of the physical object is positioned to contact the virtual item.

20. A non-transitory computer-readable medium comprising one or more computer-executable instructions that, when executed by at least one processor of a computing device, cause the computing device to:
  generate a virtual item within a virtual environment;
  detect, using one or more hardware sensors, a current position of at least one physical object associated with a user, wherein the physical object is to be portrayed within the virtual environment;
  generate a virtual representation of the physical object within the virtual environment, wherein the virtual representation of the physical object is configured to at least partially follow movements of the physical object relative to the virtual item;
  determine the intent of the user's movements of the physical object relative to the virtual item; and
  present the virtual item and the generated virtual representation of the physical object within the virtual environment, wherein the virtual representation of the physical object is at least partially, controllably decoupled by a specified amount from the movements of the physical object relative to the virtual item, wherein the specified amount of controlled decoupling is determined based on the determined intent of the user's movements.

\* \* \* \* \*